(12) United States Patent
McMackin

(10) Patent No.: US 9,880,054 B2
(45) Date of Patent: Jan. 30, 2018

(54) SIMPLIFIED COMPRESSIVE SENSING SPECTRAL IMAGER

(71) Applicant: InView Technology Corporation, Austin, TX (US)

(72) Inventor: Lenore McMackin, Austin, TX (US)

(73) Assignee: InView Technology Corporation, Austin, TX (US)

( * ) Notice: Subject to any disclaimer, the term of this patent is extended or adjusted under 35 U.S.C. 154(b) by 29 days.

(21) Appl. No.: 14/341,361

(22) Filed: Jul. 25, 2014

(65) Prior Publication Data

US 2015/0029503 A1    Jan. 29, 2015

Related U.S. Application Data

(60) Provisional application No. 61/859,124, filed on Jul. 26, 2013.

(51) Int. Cl.
*G01J 3/00* (2006.01)
*G01J 3/28* (2006.01)
(Continued)

(52) U.S. Cl.
CPC .......... *G01J 3/2823* (2013.01); *G01J 3/0208* (2013.01); *G01J 3/18* (2013.01); *H04N 5/335* (2013.01);
(Continued)

(58) Field of Classification Search
CPC .... G01J 3/18; G01J 3/2823; G01J 2003/2826; G01J 3/0208; Y10T 29/49826; H04N 5/335; H04N 9/045
(Continued)

(56) References Cited

U.S. PATENT DOCUMENTS 5,402,227 A * 3/1995 Schuma ............... G01J 3/2823
356/328
6,101,034 A * 8/2000 Cox ..................... G01J 3/2823
359/399

(Continued)

FOREIGN PATENT DOCUMENTS

WO    WO2014012848    *    1/2014

OTHER PUBLICATIONS

Dunlop, Matthew, et al. "Calibration challenges and initial experimental demonstration of an adaptive, feature-specific spectral imaging classifier." Computational Optical Sensing and Imaging. Optical Society of America, 2013.*

(Continued)

*Primary Examiner* — Hina F Ayub
(74) *Attorney, Agent, or Firm* — Meyertons Hood Kivlin Kowert & Goetzel, P.C.; Jeffrey C. Hood; Mark K. Brightwell

(57) ABSTRACT

A method for designing a spectral sensing device. The method includes: (1) performing computational operations on a computer, wherein the computational operations determine the positions of diffracted orders of an optical system model that models at least an array of light modulating elements and a diffraction grating, wherein the diffracted orders correspond to respective spectral components of input light to the optical system model, wherein the positions of the diffracted orders are determined at a target plane of the optical system model; and (2) storing the positions of the diffracted orders in a memory, wherein the positions determine corresponding locations for light detectors in the spectral sensing device. The spectral sensing device may be assembled by modifying an existing single pixel camera, i.e., by adding the diffraction grating and adding the light (Continued)

detectors respectively at said positions of the diffracted orders.

18 Claims, 10 Drawing Sheets

(51) Int. Cl.
*G01J 3/18* (2006.01)
*G01J 3/02* (2006.01)
*H04N 5/335* (2011.01)
*H04N 9/04* (2006.01)

(52) U.S. Cl.
CPC ......... *H04N 9/045* (2013.01); *Y10T 29/49826* (2015.01)

(58) Field of Classification Search
USPC .......................................................... 356/300
See application file for complete search history.

(56) References Cited

U.S. PATENT DOCUMENTS

| | | | | |
|---|---|---|---|---|
| 6,522,403 B2 * | 2/2003 | Wilson | ............... | G01J 3/02 356/328 |
| 6,859,275 B2 * | 2/2005 | Fateley | ............... | G01J 3/02 356/310 |
| 7,026,626 B2 * | 4/2006 | Harrison | ............... | G01J 3/2803 250/372 |
| 7,283,233 B1 * | 10/2007 | Ho | ............... | G01J 3/22 356/328 |
| 7,336,353 B2 * | 2/2008 | Brady | ............... | G01J 3/02 356/310 |
| 9,013,691 B2 * | 4/2015 | Golub | ............... | H04N 9/045 356/326 |
| 2005/0068526 A1 * | 3/2005 | Avrutsky | ............... | G01J 3/0259 356/328 |
| 2006/0082771 A1 * | 4/2006 | Doerrmann | ............... | G01J 3/02 356/328 |
| 2008/0212034 A1 * | 9/2008 | Aksyuk | ............... | G02B 27/48 353/20 |
| 2009/0046952 A1 * | 2/2009 | Ben-Ezra | ............... | G06T 3/4053 382/299 |
| 2011/0273707 A1 * | 11/2011 | Labrecque | ............... | G01J 3/02 356/305 |
| 2012/0038789 A1 * | 2/2012 | Kelly | ............... | G02B 26/0833 348/226.1 |
| 2012/0327287 A1 * | 12/2012 | Meyers | ............... | H04N 5/30 348/335 |
| 2014/0167753 A1 * | 6/2014 | Sperl | ............... | G01R 33/56341 324/309 |
| 2014/0240514 A1 * | 8/2014 | Love | ............... | G01J 3/2823 348/164 |
| 2015/0070741 A1 * | 3/2015 | Bowron | ............... | G03B 9/02 359/223.1 |
| 2016/0033757 A1 * | 2/2016 | Kurtz | ............... | H04N 5/7458 359/292 |
| 2016/0066775 A1 * | 3/2016 | Hunter | ............... | G01J 3/0291 600/178 |
| 2017/0160135 A1 * | 6/2017 | Golub | ............... | G01J 3/2823 |

OTHER PUBLICATIONS

Gehm, M. E., et al. "Single-shot compressive spectral imaging with a dual-disperser architecture." Optics express 15.21 (2007): 14013-14027.*

* cited by examiner perform computational operations, wherein the computational operations determine the positions of diffracted orders of an optical system model that models at least an array of light modulating elements and a diffraction grating, wherein the diffracted orders correspond to respective spectral components of input light to the optical system model, wherein the positions of the diffracted orders are determined at a target plane of the optical system model ⟶ 1210 store the positions of the diffracted orders in a memory, wherein the positions determine corresponding locations for light detectors in the spectral sensing device ⟶ 1220

FIG. 12

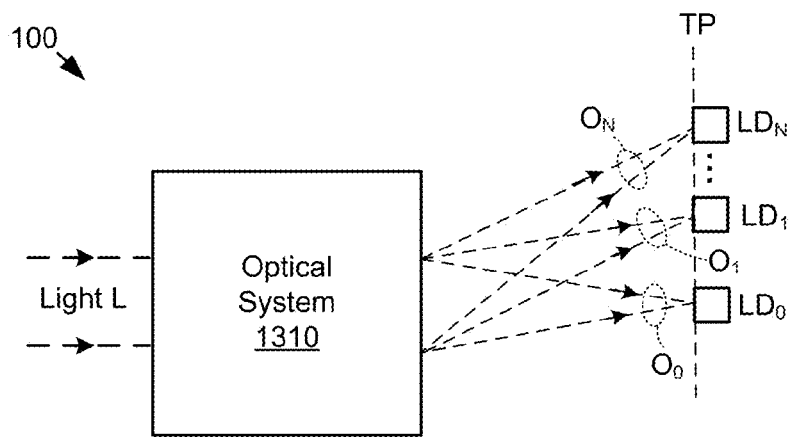

FIG. 13

SIMPLIFIED COMPRESSIVE SENSING SPECTRAL IMAGER

PRIORITY CLAIM DATA

This application claims the benefit of priority to U.S. Provisional Application No. 61/859,124, filed Jul. 26, 2013, invented by Lenore McMackin, which is hereby incorporated by reference in its entirety as though fully and completely set forth herein.

FIELD

The present disclosure relates to the field of compressive sensing, and more particularly, to a mechanism for separating spectral components in a manner that supports the acquisition of multi-spectral information in signals received by a compressive imaging device.

DESCRIPTION OF THE RELATED ART

According to Nyquist theory, a signal x(t) whose signal energy is supported on the frequency interval [−B,B] may be reconstructed from samples {x(nT)} of the signal x(t), provided the rate $f_s=1/T_s$ at which the samples are captured is sufficiently high, i.e., provided that $f_s$ is greater than 2B. Similarly, for a signal whose signal energy is supported on the frequency interval [A,B], the signal may be reconstructed from samples captured with sample rate greater than B−A. A fundamental problem with any attempt to capture a signal x(t) according to Nyquist theory is the large number of samples that are generated, especially when B (or B−A) is large. The large number of samples is taxing on memory resources and on the capacity of transmission channels.

Nyquist theory is not limited to functions of time. Indeed, Nyquist theory applies more generally to any function of one or more real variables. For example, Nyquist theory applies to functions of two spatial variables such as images, to functions of time and two spatial variables such as video, and to the functions used in multispectral imaging, hyperspectral imaging, medical imaging and a wide variety of other applications. In the case of an image I(x,y) that depends on spatial variables x and y, the image may be reconstructed from samples of the image, provided the samples are captured with sufficiently high spatial density. For example, given samples {I(nΔx,mΔy)} captured along a rectangular grid, the horizontal and vertical densities 1/Δx and 1/Δy should be respectively greater than 2Bx and 2By, where Bx and By are the highest x and y spatial frequencies occurring in the image I(x,y). The same problem of overwhelming data volume is experienced when attempting to capture an image according to Nyquist theory. The modern theory of compressive sensing is directed to such problems.

Compressive sensing relies on the observation that many signals (e.g., images or video sequences) of practical interest are not only band-limited but also sparse or approximately sparse when represented using an appropriate choice of transformation, for example, a transformation such as a Fourier transform, a wavelet transform or a discrete cosine transform (DCT). A signal vector v is said to be K-sparse with respect to a given transformation G when the transformation of the signal vector, Gv, has no more than K non-zero coefficients. A signal vector v is said to be sparse with respect to a given transformation G when it is K-sparse with respect to that transformation for some integer K much smaller than the number L of components in the transformation vector Gv.

A signal vector v is said to be approximately K-sparse with respect to a given transformation G when the coefficients of the transformation vector, Gv, are dominated by the K largest coefficients (i.e., largest in the sense of magnitude or absolute value). In other words, if the K largest coefficients account for a high percentage of the energy in the entire set of coefficients, then the signal vector v is approximately K-sparse with respect to transformation G. A signal vector v is said to be approximately sparse with respect to a given transformation G when it is approximately K-sparse with respect to the transformation G for some integer K much less than the number L of components in the transformation vector Gv.

Given a sensing device that captures images with N samples per image and in conformity to the Nyquist condition on spatial rates, it is often the case that there exists some transformation and some integer K very much smaller than N such that the transform of each captured image will be approximately K sparse. The set of K dominant coefficients may vary from one image to the next. Furthermore, the value of K and the selection of the transformation may vary from one context (e.g., imaging application) to the next. Examples of typical transforms that might work in different contexts include the Fourier transform, the wavelet transform, the DCT, the Gabor transform, etc.

Compressive sensing specifies a way of operating on the N samples of an image so as to generate a much smaller set of samples from which the N samples may be reconstructed, given knowledge of the transform under which the image is sparse (or approximately sparse). In particular, compressive sensing invites one to think of the N samples as a vector v in an N-dimensional space and to imagine projecting the vector v onto each vector in a series of M vectors {R(i): i=1, 2, . . . , M} in the N-dimensional space, where M is larger than K but still much smaller than N. Each projection gives a corresponding real number S(i), e.g., according to the expression $$S(i)=<v,R(i)>,$$

where the notation <v,R(i)> represents the inner product (or dot product) of the vector v and the vector R(i). Thus, the series of M projections gives a vector U including M real numbers: $U_i=S(i)$. Compressive sensing theory further prescribes methods for reconstructing (or estimating) the vector v of N samples from the vector U of M real numbers and the series of measurement vectors {R(i): i=1, 2, . . . , M}. For example, according to one method, one should determine the vector x that has the smallest length (in the sense of the $L_1$ norm) subject to the condition that ΦTx=U, where Φ is a matrix whose rows are the transposes of the vectors R(i), where T is a transformation under which the image is K sparse or approximately K sparse.

Compressive sensing is important because, among other reasons, it allows reconstruction of an image based on M measurements instead of the much larger number of measurements N recommended by Nyquist theory. Thus, for example, a compressive sensing camera would be able to capture a significantly larger number of images for a given size of image store, and/or, transmit a significantly larger number of images per unit time through a communication channel of given capacity.

As mentioned above, compressive sensing operates by projecting the image vector v onto a series of M vectors. As discussed in U.S. Pat. No. 8,199,244, issued Jun. 12, 2012 (invented by Baraniuk et al.) and illustrated in FIG. 1, an imaging device (referred to herein as a single pixel camera) may be configured to take advantage of the compressive-sensing paradigm by using a digital micromirror device (DMD) 40. An incident lightfield 10 passes through a lens 20 and then interacts with the DMD 40. The DMD includes a two-dimensional array of micromirrors, each of which is configured to independently and controllably switch between two orientation states. Each micromirror reflects a corresponding portion of the incident light field based on its instantaneous orientation. Any micromirrors in a first of the two orientation states will reflect their corresponding light portions so that they pass through lens 50. Any micromirrors in a second of the two orientation states will reflect their corresponding light portions away from lens 50. Lens 50 serves to concentrate the light portions from micromirrors in the first orientation state onto a photodiode (or photodetector) situated at location 60. Thus, the photodiode generates a signal whose amplitude at any given time represents a sum of the intensities of the light portions from the micromirrors in the first orientation state.

The compressive sensing is implemented by driving the orientations of the micromirrors through a series of spatial patterns. Each spatial pattern specifies an orientation state for each of the micromirrors. Each of the spatial patterns may be derived from a corresponding row of the matrix $\Phi$, e.g., by wrapping the corresponding row into a 2D array whose dimensions match the dimensions of the micromirror array. The output signal of the photodiode is digitized by an A/D converter 70. In this fashion, the imaging device is able to capture a series of measurements $\{S(i)\}$ that represent inner products (dot products) between the incident light field and the series of spatial patterns without first acquiring the incident light field as a pixelized digital image. The incident light field corresponds to the vector v of the discussion above, and the spatial patterns correspond to the vectors R(i) of the discussion above.

The incident light field may be modeled by a function I(x,y,t) of two spatial variables and time. Assuming for the sake of discussion that the DMD comprises a rectangular array, the DMD implements a spatial modulation of the incident light field so that the light field leaving the DMD in the direction of the lens 50 might be modeled by $$\{I(n\Delta x, m\Delta y, t) * M(n,m,t)\}$$

where m and n are integer indices, where $I(n\Delta x, m\Delta y, t)$ represents the portion of the light field that is incident upon that $(n,m)^{th}$ mirror of the DMD at time t. The function $M(n,m,t)$ represents the orientation of the $(n,m)^{th}$ mirror of the DMD at time t. At sampling times, the function $M(n,m,t)$ equals one or zero, depending on the state of the digital control signal that controls the $(n,m)^{th}$ mirror. The condition $M(n,m,t)=1$ corresponds to the orientation state that reflects onto the path that leads to the lens 50. The condition $M(n,m,t)=0$ corresponds to the orientation state that reflects away from the lens 50.

The lens 50 concentrates the spatially-modulated light field $$\{I(n\Delta x, m\Delta y, t) * M(n,m,t)\}$$

onto a light sensitive surface of the photodiode. Thus, the lens and the photodiode together implement a spatial summation of the light portions in the spatially-modulated light field:

$$S(t) = \sum_{n,m} I(n\Delta x, m\Delta y, t) M(n,m,t).$$

Signal S(t) may be interpreted as the intensity at time t of the concentrated spot of light impinging upon the light sensing surface of the photodiode. The A/D converter captures measurements of S(t). In this fashion, the compressive sensing camera optically computes an inner product of the incident light field with each spatial pattern imposed on the mirrors. The multiplication portion of the inner product is implemented by the mirrors of the DMD. The summation portion of the inner product is implemented by the concentrating action of the lens and also the integrating action of the photodiode.

In conventional cameras it is often desirable to measure a number of narrower spectral components of a broadband light field, which, in one instance, may be combined to form a color image. In another instance, the various spectral components may be examined separately. Mechanisms for color imaging in conventional cameras are well understood.

In the context of compressive sensing (CS), it may be desirable to measure various spectral components of the light field. As described above, the method of creating an image in a compressive imaging (or, CS) device is fundamentally different than in traditional imaging devices such as digital cameras. In CS imaging, a single element photodetector is used in conjunction with a spatial light modulator to replace the pixel array used in traditional cameras. Sophisticated mathematical techniques are used to reconstruct an image from a set of detector measurements and the corresponding set of modulation patterns.

The concept of CS imaging at multiple spectral bands has been demonstrated in a series of experiments:

T. Sun and K. Kelly, "Compressive Sensing Hyperspectral Imager," in Computational Optical Sensing and Imaging, OSA Technical Digest (CD) (Optical Society of America, 2009), paper CTuA5; and L. Xu, T. Sun, and K. Kelly, "Compressive Sensing Echelle Spectrometer," in Computational Optical Sensing and Imaging, OSA Technical Digest (CD) (Optical Society of America, 2009), paper CThC6.

In these visual band experiments, image light modulated by CS measurement patterns is focused into the fiber optic entrance aperture of a commercial visible spectrometer. Effectively, the single detector of a CS camera is replaced with the spectrometer's linear dispersion grating and a linear detector array so that measurements from each of the detector elements correspond to a different spectral band. The CS measurements from each band are reconstructed independently into a separate spectral image. Thus, each pixel in the array is effectively its own single-pixel CS camera. Since all the spectral data is retrieved from a broadband light field simultaneously, the spectral images can be combined into a complete hyperspectral data cube.

The key advantage of this previously described CS imaging spectrometer is that two-dimensional images can be reconstructed from a series of spectral intensity measurements taken using a linear detector array without the scanning, push-broom, or whiskbroom motion that is usually necessary to retrieve multi-spectral, two-dimensional images from a conventional imaging spectrometer. However, this CS spectral imaging device requires the combination of two sophisticated components, a CS camera front end with a spectrometer module at the back end.

In addition to the complexity of integrating a CS camera with a spectrometer, there is also a loss of optical efficiency due to the need to couple light from the CS camera into the small width of typical entrance apertures of spectrometers.

Thus, there exists a need for a simplified CS spectral imaging system that has the same advantages of the CS-based spectral imager, namely the ability to create two-dimensional images at multiple wavelengths without requirements for either a two-dimensional array of pixels or a scanning system, and additionally, without the cost, complexity and loss of efficiency in combining a traditional CS camera with a traditional spectrometer.

SUMMARY

In some embodiments, a spectral sensing device may include an optical system and a plurality of light detectors. The optical system may include an array of light modulating elements and a diffraction grating. The plurality of light detectors may be located at respective positions within a target plane of the optical system, wherein the positions are positions of diffracted orders of the optical system, wherein the diffracted orders correspond respectively to spectral components of input light to the optical system. The positions may be computed based on an optical model of the optical system, e.g., as variously described herein.

In one embodiment, the spectral sensing device may include one or more broadband light detectors located in the target plane at a position of a zeroth undiffracted order of the optical system.

In one embodiment, the spectral sensing device also includes a spectral selection subsystem configured to: (a) receive input light; (b) output a first portion of the input light to the array of light modulating elements; and (b) output a second portion of the input light to a secondary path leading to an additional light detector.

The array of light modulating elements may be configured to apply a temporal sequence of spatial patterns to an input stream of light. The spectral sensing device may include a controller configured to: (a) receive signals from the light detectors; and (b) dynamically adapt the sequence of spatial patterns based on an analysis of the received signals.

In one embodiment, the spectral sensing device is realized by modifying a pre-existing single pixel camera, e.g., as variously described herein.

In some embodiments, a method for designing a spectral sensing device may involve the following operations.

The method may include performing computational operation on a computer, wherein the computational operations determine the positions of diffracted orders of an optical system model that models at least an array of light modulating elements and a diffraction grating, wherein the diffracted orders correspond to respective spectral components of input light to the optical system model, wherein the positions of the diffracted orders are determined at a target plane of the optical system model.

The positions of the diffracted orders may be stored in a memory. The positions may determine corresponding locations for light detectors in the spectral sensing device.

The method may also include assembling the spectral sensing device by modifying a single pixel camera. Prior to said modifying, the single pixel camera may include the array of light modulating elements and a light detector L. The action of modifying the signal pixel camera may include: (a) installing the diffraction grating at a location consistent with the optical system model; (b) removing the light detector L; and (c) installing the light detectors respectively at said positions of the diffracted orders.

BRIEF DESCRIPTION OF THE DRAWINGS

A better understanding of the present invention can be obtained when the following detailed description of the preferred embodiments is considered in conjunction with the following drawings.

FIG. 12 illustrates one embodiment of a method for designing a spectral sensing device.

FIG. 13 illustrates one embodiment of a spectral sensing device.

Figure 1:
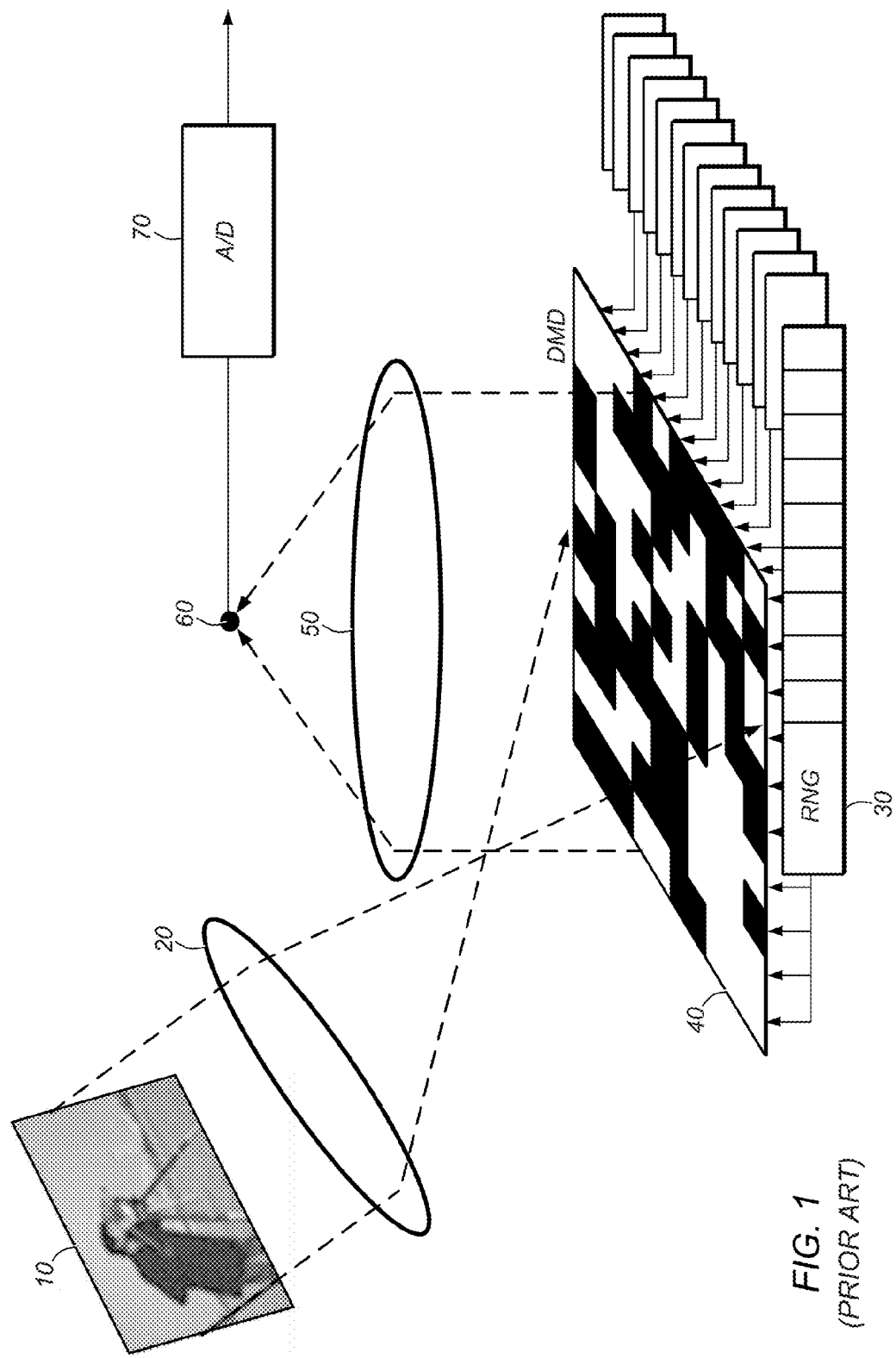
FIG. 1 illustrates a single pixel camera according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporations by Reference

The following patent applications are hereby incorporated by reference in their entireties as though fully and completely set forth herein.

U.S. patent application Ser. No. 13/193,553, filed Jul. 28, 2011, entitled "Determining Light Level Variation in Compressive Imaging by Injecting Calibration Patterns into Pattern Sequence";

U.S. patent application Ser. No. 13/197,304, filed Aug. 3, 2011, entitled "Decreasing Image Acquisition Time for Compressive Imaging Devices";

U.S. patent application Ser. No. 13/207,276, filed Aug. 10, 2011, entitled "Dynamic Range Optimization in a Compressive Imaging System";

U.S. patent application Ser. No. 13/207,258, filed Aug. 10, 2011, entitled "Adaptively Filtering Compressive Imaging Measurements to Attenuate Noise";

U.S. patent application Ser. No. 13/207,900, filed Aug. 11, 2011, entitled "TIR Prism to Separate Incident Light and Modulated Light in Compressive Imaging Device";

U.S. Provisional Application No. 61/502,153, filed Jun. 28, 2011, entitled "Various Compressive Sensing Mechanisms";

U.S. patent application Ser. No. 13/534,528, filed Jun. 27, 2012, entitled "Mechanisms for Conserving Power in a Compressive Imaging System";

U.S. patent application Ser. No. 13/193,556, filed Jul. 28, 2011, entitled "Low-Pass Filtering of Compressive Imaging Measurements to Infer Light Level Variation";

U.S. patent application Ser. No. 14/017,834, filed Sep. 4, 2013, entitled "Dual-Port Measurements of Light Reflected from Micromirror Array to Infer Light Level Variation in Compressive Imaging";

U.S. patent application Ser. No. 14/135,154, filed Dec. 19, 2013, entitled "Improved Compensation of Compressive Imaging Measurements based on Measurements from Power Meter";

U.S. patent application Ser. No. 13/208,263, filed Aug. 11, 2011, entitled "Focusing Mechanisms for Compressive Imaging Device";

U.S. Provisional Application No. 61/541,582, filed Sep. 30, 2011, entitled "Adaptive Imaging Architecture and Algorithms for Hyperspectral Image-based Classification for Chemical Plume Analysis";

U.S. patent application Ser. No. 13/631,626, filed Sep. 28, 2012, entitled "Adaptive Search for Atypical Regions in Incident Light Field and Spectral Classification of Light in the Atypical Regions";

U.S. patent application Ser. No. 13/664,289, filed Oct. 30, 2012, entitled "High-Speed Event Detection Using A Compressive-Sensing Hyperspectral-Imaging Architecture";

U.S. patent application Ser. No. 13/534,414, filed Jun. 27, 2012, entitled "Image Sequence Reconstruction based on Overlapping Measurement Subsets;

U.S. patent application Ser. No. 14/106,542, filed Dec. 13, 2013, entitled "Overlap Patterns and Image Stitching for Multiple-Diode CS Camera".

Any of the embodiments described in these incorporated patent applications may be combined with any of the embodiments described in the present patent to form composite embodiments, as desired.

System 100 for Operating on Light

Figure 2:
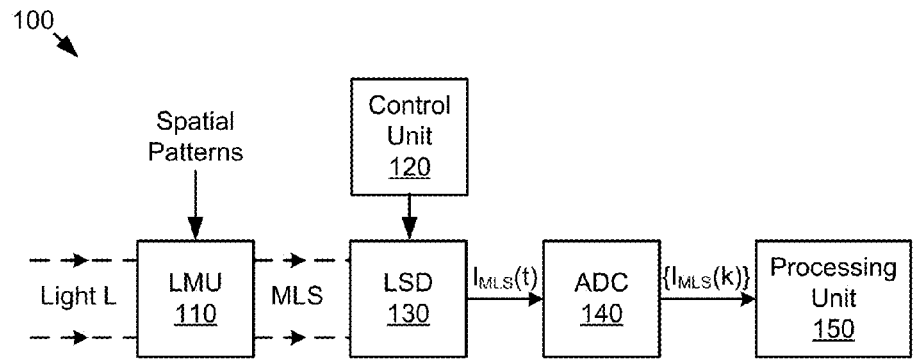
FIG. 2 illustrates one embodiment of a system 100 that is operable to capture compressive imaging samples. (LMU is an acronym for "light modulation unit". MLS is an acronym for "modulated light stream". LSD is an acronym for "light sensing device".)

A system 100 for operating on light may be configured as shown in FIG. 2. The system 100 may include a light modulation unit 110, a light sensing device 130 and an analog-to-digital converter (ADC) 140.

The light modulation unit 110 is configured to modulate a received stream of light L with a series of spatial patterns in order to produce a modulated light stream (MLS). The spatial patterns of the series may be applied sequentially to the light stream so that successive time slices of the light stream are modulated, respectively, with successive ones of the spatial patterns. (The action of sequentially modulating the light stream L with the spatial patterns imposes the structure of time slices on the light stream.) The light modulation unit 110 includes a plurality of light modulating elements configured to modulate corresponding portions of the light stream. Each of the spatial patterns specifies an amount (or extent or value) of modulation for each of the light modulating elements. Mathematically, one might think of the light modulation unit's action of applying a given spatial pattern as performing an element-wise multiplication of a light field vector ($x_{ij}$) representing a time slice of the light stream L by a vector of scalar modulation values ($m_{ij}$) to obtain a time slice of the modulated light stream: ($m_{ij}$)* ($x_{ij}$)=($m_{ij}$*$x_{ij}$). The vector ($m_{ij}$) is specified by the spatial pattern. Each light modulating element effectively scales (multiplies) the intensity of its corresponding stream portion by the corresponding scalar factor.

The light modulation unit 110 may be realized in various ways. In some embodiments, the LMU 110 may be realized by an array of mirrors (e.g., micromirrors) whose orientations are independently controllable. In another set of embodiments, the LMU 110 may be realized by an array of elements whose transmittances are independently controllable, e.g., as with an array of LCD shutters. An electrical control signal supplied to each element controls the extent to which light is able to transmit through the element. In yet another set of embodiments, the LMU 110 may be realized by an array of independently-controllable mechanical shutters (e.g., micromechanical shutters) that cover an array of apertures, with the shutters opening and closing in response to electrical control signals, thereby controlling the flow of light through the corresponding apertures. In yet another set of embodiments, the LMU 110 may be realized by a perforated mechanical plate, with the entire plate moving in response to electrical control signals, thereby controlling the flow of light through the corresponding perforations.

The light sensing device 130 is configured to receive the modulated light stream MLS and to generate an analog electrical signal $I_{MLS}(t)$ representing intensity of the modulated light stream as a function of time.

The light sensing device 130 may include one or more light sensing elements. The term "light sensing element" may be interpreted as meaning "a transducer between a light signal and an electrical signal". For example, a photodiode is a light sensing element. In various other embodiments, light sensing elements might include devices such as metal-semiconductor-metal (MSM) photodetectors, phototransistors, phototubes and photomultiplier tubes.

The ADC 140 acquires a sequence of samples $\{I_{MLS}(k)\}$ of the analog electrical signal $I_{MLS}(t)$. Each of the samples may be interpreted as an inner product between a corresponding time slice of the light stream L and a corresponding one of the spatial patterns. The set of samples $\{I_{MLS}(k)\}$ comprises an encoded representation, e.g., a compressed representation, of an image (or a video sequence) and may be used to construct the image (or video sequence) based on any construction algorithm known in the field of compressive sensing. (For video sequence construction, the samples may be partitioned into contiguous subsets, and then the subsets may be processed to construct corresponding images.)

In some embodiments, the samples $\{I_{MLS}(k)\}$ may be used for some purpose other than, or in addition to, image (or video) construction. For example, system 100 (or some other system) may operate on the compensated samples to perform an inference task, such as detecting the presence of a signal or object, identifying a signal or an object, classifying a signal or an object, estimating one or more parameters relating to a signal or an object, tracking a signal or an object, etc. In some embodiments, an object under observation by system 100 may be identified or classified by virtue of its sample set $\{I_{MLS}(k)\}$, or parameters derived from that sample set, being similar to one of a collection of stored sample sets (or parameter sets).

In some embodiments, the light sensing device 130 includes exactly one light sensing element. (For example, the single light sensing element may be a photodiode.) The light sensing element may couple to an amplifier (e.g., a TIA) (e.g., a multi-stage amplifier).

In some embodiments, the light sensing device 130 may include a plurality of light sensing elements (e.g., photodiodes). Each light sensing element may convert light impinging on its light sensing surface into a corresponding analog electrical signal representing intensity of the impinging light as a function of time. In some embodiments, each light sensing element may couple to a corresponding amplifier so that the analog electrical signal produced by the light sensing element can be amplified prior to digitization. System 100 may be configured so that each light sensing element receives, e.g., a corresponding spatial portion (or spectral portion) of the modulated light stream.

In some embodiments, the system 100 may include a memory (or a set of memories of one or more kinds).

In some embodiments, system 100 may include a processing unit 150, e.g., as shown in FIG. 2. The processing unit 150 may be a digital circuit or a combination of digital circuits. For example, the processing unit may be a microprocessor (or system of interconnected of microprocessors), a programmable hardware element such as a field-programmable gate array (FPGA), an application specific integrated circuit (ASIC), or any combination such elements. The processing unit 150 may be configured to perform one or more functions such as image/video construction, system control, user interface, statistical analysis, and one or more inferences tasks.

The system 100 (e.g., the processing unit 150) may store the samples $\{I_{MLS}(k)\}$ in a memory, e.g., a memory resident in the system 100 or in some other system.

In one embodiment, processing unit 150 is configured to operate on the samples $\{I_{MLS}(k)\}$ to generate the image or video sequence. In this embodiment, the processing unit 150 may include a microprocessor configured to execute software (i.e., program instructions), especially software for performing an image/video construction algorithm. In one embodiment, system 100 is configured to transmit the compensated samples to some other system through a communication channel. (In embodiments where the spatial patterns are randomly-generated, system 100 may also transmit the random seed(s) used to generate the spatial patterns.) That other system may operate on the samples to construct the image/video. System 100 may have one or more interfaces configured for sending (and perhaps also receiving) data through one or more communication channels, e.g., channels such as wireless channels, wired channels, fiber optic channels, acoustic channels, laser-based channels, etc.

In some embodiments, processing unit 150 is configured to use any of a variety of algorithms and/or any of a variety of transformations to perform image/video construction. System 100 may allow a user to choose a desired algorithm and/or a desired transformation for performing the image/video construction.

In some embodiments, the system 100 is configured to acquire a set $Z_M$ of samples from the ADC 140 so that the sample set $Z_M$ corresponds to M of the spatial patterns applied to the light modulation unit 110, where M is a positive integer. The number M is selected so that the sample set $Z_M$ is useable to construct an n-pixel image or n-voxel video sequence that represents the incident light stream, where n is a positive integer less than or equal to the number N of light modulating elements in the light modulation unit 110. System 100 may be configured so that the number M is smaller than n. Thus, system 100 may operate as a compressive sensing device. (The number of "voxels" in a video sequence is the number of images in the video sequence times the number of pixels per image, or equivalently, the sum of the pixel counts of the images in the video sequence.)

In some embodiments, system 100 may include an optical subsystem 105 that is configured to modify or condition or operate on the light stream L before it arrives at the light modulation unit 110, e.g., as shown in FIG. 2C. For example, the optical subsystem 105 may be configured to receive the light stream L from the environment and to focus the light stream onto a modulating plane of the light modulation unit 110. The optical subsystem 105 may include a camera lens (or a set of lenses). The lens (or set of lenses) may be adjustable to accommodate a range of distances to external objects being imaged/sensed/captured. In some embodiments, the optical subsystem 105 includes a conventional camera lens unit, e.g., configured for mounting in a standard mount.

In some embodiments, system 100 may include an optical subsystem 117 to direct the modulated light stream MLS onto a light sensing surface (or surfaces) of the light sensing device 130.

In some embodiments, the optical subsystem 117 may include one or more lenses, and/or, one or more mirrors.

In some embodiments, the optical subsystem 117 is configured to focus the modulated light stream onto the light sensing surface (or surfaces). The term "focus" implies an attempt to achieve the condition that rays (photons) diverging from a point on an object plane converge to a point (or an acceptably small spot) on an image plane. The term "focus" also typically implies continuity between the object plane point and the image plane point (or image plane spot)—points close together on the object plane map respectively to points (or spots) close together on the image plane. In at least some of the system embodiments that include an array of light sensing elements, it may be desirable for the modulated light stream MLS to be focused onto the light sensing array so that there is continuity between points on the light modulation unit LMU and points (or spots) on the light sensing array.

In some embodiments, the optical subsystem 117 may be configured to direct the modulated light stream MLS onto the light sensing surface (or surfaces) of the light sensing device 130 in a non-focusing fashion. For example, in a system embodiment that includes only one photodiode, it may not be so important to achieve the "in focus" condition at the light sensing surface of the photodiode since positional information of photons arriving at that light sensing surface will be immediately lost.

In one embodiment, the optical subsystem 117 may be configured to receive the modulated light stream and to concentrate the modulated light stream into an area (e.g., a small area) on a light sensing surface of the light sensing device 130. Thus, the diameter of the modulated light stream may be reduced (possibly, radically reduced) in its transit from the optical subsystem 117 to the light sensing surface (or surfaces) of the light sensing device 130. For example, in some embodiments, the diameter may be reduced by a factor of more than 1.5 to 1. In other embodiments, the diameter may be reduced by a factor of more than 2 to 1. In yet other embodiments, the diameter may be reduced by a factor of more than 10 to 1. In yet other embodiments, the diameter may be reduced by factor of more than 100 to 1. In yet other embodiments, the diameter may be reduced by factor of more than 400 to 1. In one embodiment, the diameter is reduced so that the modulated light stream is concentrated onto the light sensing surface of a single light sensing element (e.g., a single photodiode).

In some embodiments, this feature of concentrating the modulated light stream onto the light sensing surface (or surfaces) of the light sensing device allows the light sensing device to sense, at any given time, the sum (or surface integral) of the intensities of the modulated light portions within the modulated light stream. (Each time slice of the modulated light stream comprises a spatial ensemble of modulated light portions due to the modulation unit's action of applying the corresponding spatial pattern to the light stream.)

In some embodiments, e.g., in embodiments of the spectral imager described herein, the spectral components need to be in the focal plane (or far field) of the lens to get the desired effect. However, the zeroth order detector (if any) can be in any plane, e.g., as described above.

In some embodiments, system 100 may include a control unit 120 configured to supply the spatial patterns to the light modulation unit 110, as shown in FIG. 2. The control unit may itself generate the patterns or may receive the patterns from some other agent. The control unit 120 and the light sensing device 130 may be controlled by a common clock signal so that the light sensing device 130 can coordinate (synchronize) its action of capturing the samples $\{I_{MLS}(k)\}$ with the control unit's action of supplying spatial patterns to the light modulation unit 110. (System 100 may include clock generation circuitry.)

In some embodiment, the control unit 120 may supply the spatial patterns to the light modulation unit in a periodic fashion.

The control unit 120 may be a digital circuit or a combination of digital circuits. For example, the control unit may include a microprocessor (or system of interconnected of microprocessors), a programmable hardware element such as a field-programmable gate array (FPGA), an application specific integrated circuit (ASIC), or any combination such elements.

In some embodiments, system 100 may include a display (or an interface configured for coupling to a display) for displaying constructed images/videos.

In some embodiments, system 100 may include one or more input devices (and/or, one or more interfaces for input devices), e.g., any combination or subset of the following devices: a set of buttons and/or knobs, a keyboard, a keypad, a mouse, a touch-sensitive pad such as a trackpad, a touch-sensitive display screen, one or more microphones, one or more temperature sensors, one or more chemical sensors, one or more pressure sensors, one or more accelerometers, one or more orientation sensors (e.g., a three-axis gyroscopic sensor), one or more proximity sensors, one or more antennas, etc.

Regarding the spatial patterns that are used to modulate the light stream L, it should be understood that there are a wide variety of possibilities. In some embodiments, the control unit 120 may be programmable so that any desired set of spatial patterns may be used.

The system 100 may be configured to operate in a compressive fashion, where the number of the samples $\{I_{MLS}(k)\}$ captured by the system 100 is less than (e.g., much less than) the number of pixels in the image (or video) to be constructed from the samples. In many applications, this compressive realization is very desirable because it saves on power consumption, memory utilization and transmission bandwidth consumption. However, non-compressive realizations are contemplated as well.

In some embodiments, the system 100 is configured as a camera or imager that captures information representing an image (or a series of images) from the external environment, e.g., an image (or a series of images) of some external object or scene. The camera system may take different forms in different applications domains, e.g., domains such as visible light photography, infrared photography, ultraviolet photography, high-speed photography, low-light photography, underwater photography, multi-spectral imaging, hyper-spectral imaging, etc. In some embodiments, system 100 is configured to operate in conjunction with (or as part of) another system, e.g., in conjunction with (or as part of) a microscope, a telescope, a robot, a security system, a surveillance system, a fire sensor, a node in a distributed sensor network, etc.

In some embodiments, system 100 is configured as a spectrometer.

In some embodiments, system 100 is configured as a multi-spectral or hyper-spectral imager.

Figure 3:
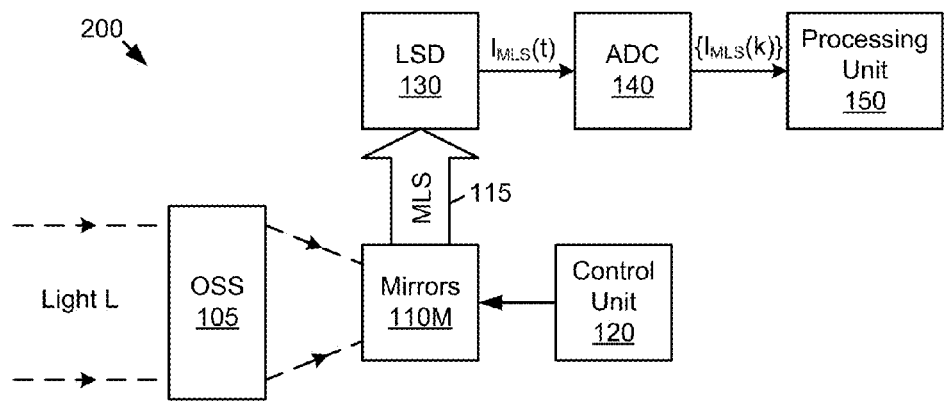
FIG. 3 illustrates system 200, where the light modulation unit 110 is realized by an array of mirrors 110M (e.g., a digital micromirror device).

In some embodiments, system 100 may include an optical subsystem that is configured to modify or condition or operate on the light stream L before it arrives at the light modulation unit 110, e.g., as shown in optical subsystem 105 of FIG. 3. For example, the optical subsystem may be configured to receive the light stream L from the environment and to focus the light stream onto a modulating plane of the light modulation unit 110. The optical subsystem may include a camera lens (or a set of lenses). The lens (or set of lenses) may be adjustable to accommodate a range of distances to external objects being imaged/sensed/captured. In some embodiments, the optical subsystem includes a conventional camera lens unit, e.g., configured for mounting in a standard mount.

In one realization 200 of system 100, the light modulation unit 110 may be realized by an array of mirrors 110M, e.g., as shown in FIG. 3. The mirrors 110M is configured to receive corresponding portions of the light L received from the environment, albeit not necessarily directly from the environment. (There may be one or more optical elements, e.g., one or more lenses along the input path to the mirrors 110M.) Each of the mirrors is configured to controllably switch between two orientation states. In addition, each of the mirrors is configured to (a) reflect the corresponding portion of the light onto a sensing path 115 when the mirror is in a first of the two orientation states and (b) reflect the corresponding portion of the light away from the sensing path when the mirror is in a second of the two orientation states.

The mirrors 110M may be arranged in a two-dimensional array or a one-dimensional array. Any of various array geometries are contemplated. For example, in different embodiments, the array may be a square array, a rectangular array, a hexagonal array, etc.

The mirrors 110M may be part of a digital micromirror device (DMD). For example, in some embodiments, one of the DMDs manufactured by Texas Instruments may be used.

The control unit 120 may be configured to drive the orientation states of the mirrors through the series of spatial patterns, where each of the patterns of the series specifies an orientation state for each of the mirrors.

The light sensing device 130 may be configured to receive the light portions reflected at any given time onto the sensing path 115 by the subset of mirrors in the first orientation state and to generate an analog electrical signal representing $I_{MLS}(t)$ representing a cumulative intensity of the received light portions as function of time. As the mirrors are driven through the series of spatial patterns, the subset of mirrors in the first orientation state will vary from one spatial pattern to the next. Thus, the cumulative intensity of light portions reflected onto the sensing path 115 and arriving at the light sensing device will vary as a function time. Note that the term "cumulative" is meant to suggest a summation (spatial integration) over the light portions arriving at the light sensing device at any given time. This summation may be implemented, at least in part, optically (e.g., by means of a lens and/or mirror that concentrates or focuses the light portions onto a concentrated area as described above).

System realization 200 may include any subset of the features, embodiments and elements discussed above with respect to system 100.

Figure 4:
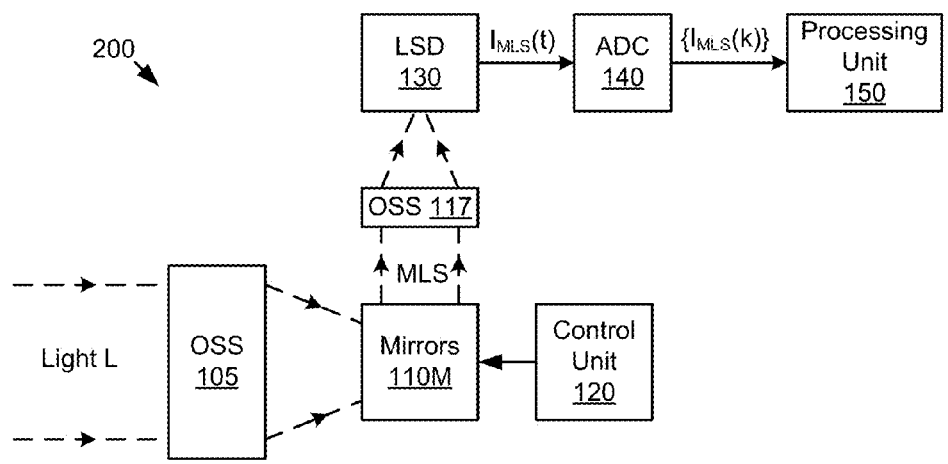
FIG. 4 shows an embodiment of system 200 that includes the optical subsystem 117 to direct or focus or concentrate the modulated light stream MLS onto the light sensing device 130.

In some embodiments, system realization 200 may include the optical subsystem 117 along the sensing path as shown in FIG. 4. The optical subsystem 117 receives the light portions reflected onto the sensing path 115 and directs (e.g., focuses or concentrates) the received light portions onto a light sensing surface (or surfaces) of the light sensing device 130. In one embodiment, the optical subsystem 117 may include a lens.

In some embodiments, the optical subsystem 117 may include one or more mirrors. Thus, the sensing path may be a bent path having more than one segment.

Simplified Imaging Spectrometer

A simplified CS Spectral Imager can be designed to operate without an attached spectrometer by using the diffractive properties of the CS camera itself to produce the spectral separation at the detector plane. A range of imaging wavelengths and bandwidths may be selected by the number, positions and sizes of the detectors used.

An important feature in the simplified CS spectral imager design that differentiates the system from the monochromatic single-pixel camera is the addition of a diffraction grating in the optical path leading to the detectors. The grating separates out a portion of the modulated image light into its spectral components to be used for detection of individual wavelength components. The grating may be configured to provide an undiffracted, undispersed 0th order intact for wide-band imaging.

The simplified CS spectral imager uses the diffractive properties of the CS camera architecture itself to produce the necessary spectral separation at the detector plane, replacing the complicated spectrometer module with a few simple components. The multi-spectral imaging capability is produced by inserting a diffraction grating at a prescribed location within the CS camera architecture and then measuring the resulting spectral components at the detector plane using a set of discrete detectors or a detector array. Images at each of the measured spectral components are constructed according to usual CS techniques.

Figure 5:
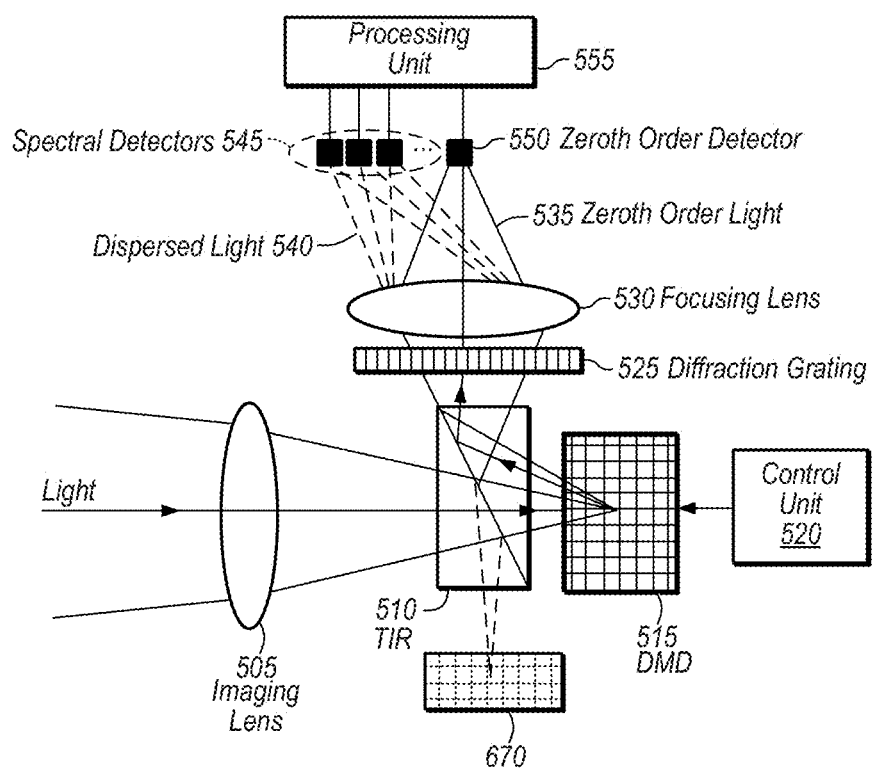
FIG. 5 illustrates one embodiment of a CS spectral imager. (CS is an acronym for "Compressive Sensing".)

FIG. 5 shows the simplified CS spectrometer operating in a single-path geometry suitable for general purpose imaging. Camera lens or other imaging system 505 provides a focused image on the DMD 515. Total internal reflection prism 510 allows the image to pass through to the DMD then reflects the modulated image into another path toward additional optics and detectors. (For more information on how to use TIR Prisms in the Context of Compressive Sensing, see U.S. patent application Ser. No. 13/207,900, now U.S. Pat. No. 8,717,484, filed Aug. 11, 2011, entitled "TIR Prism to Separate Incident Light and Modulated Light in Compressive Imaging Device", invented by Lenore McMackin and Sujoy Chatterjee, which is hereby incorporated by reference in its entirety.) The TIR prism reduces the length of the optical path making the entire system more compact and easier to build. The DMD 515 is the spatial light modulator that encodes the image with CS or other modulation patterns, which are electronically delivered by controller unit 520. In addition to modulating the intensity of the image, the micromirror array comprising the DMD also acts as a two-dimensional blazed diffraction grating that diffracts light into a number of diffraction orders containing the spatial frequency spectrum of the image as well as various wavelength components of the light.

The modulated image is directed by the TIR 510 through a diffraction grating 525 that disperses the diffracted orders of the DMD into a range of wavelength dependent angles. Light is then directed through a focusing lens 530. The zeroth order light 535, if present, is focused by 530 on to the optical axis while the dispersed light 540 focuses into separated orders at spatial distances from the axis that depend on wavelength. Detectors 545 placed at the locations of these separated orders can measure optical signals corresponding to the same modulated image at different wavelengths.

A detector 550 placed at the on-axis position will measure all the blazed orders of the DMD at all wavelengths appearing within the blaze function because the zeroth order light 535 is undiffracted by the diffraction grating 525. Signals from these detectors may be used to construct images at multiple wavelengths using compressive sensing or other computational techniques as directed by the processing unit 555.

A small set of detectors placed at these different off-axis spatial locations can simultaneously and continuously monitor and measure the spectral components of the modulated image. When the modulator is configured to display CS measurement patterns on the DMD, a set of intensity measurements can be acquired at each detector and used to reconstruct an image encompassing the DMD's two-dimensional field of view at the spectral component defined by the detector's location.

Spectral images constructed in this way may be combined to form color images or spectral data cubes.

Thus, color imaging capability is introduced to CS imagers with only minor changes to the CS imaging architecture.

These multi-color CS imaging embodiments can have the same footprint as a monochromatic CS camera.

In some embodiments, the simplified CS spectral imager may be configured to operate over a range of wavelengths of light from the ultraviolet (UV), visible, near-infrared (NIR), shortwave infrared (SWIR) and mid-wave infrared Mid-IR.

In some embodiments, the simplified CS spectral imager may be configured to measure a variety of different wavelengths depending on the number of the detectors, their geometrical sizes, and locations at the measurement plane as well as their material properties and sensitivity.

In some embodiments, the simplified CS spectral imager may be configured to measure a variety of different wavelengths depending on the size and focal length of the focusing lens.

Embodiments may be configured to measure a variety of different wavelengths depending on the grating period and orientation of the diffraction grating.

The combination of detector characteristics and position, focusing lens characteristics and diffraction grating characteristics may all be used as design parameters to achieve any of a large number of possible wavelength measurements for applications that include color cameras, microscope cameras, dual-band imagers, multi-spectral cameras, high-speed spectral monitor and signature detection devices, and hyperspectral imagers.

Figure 6:
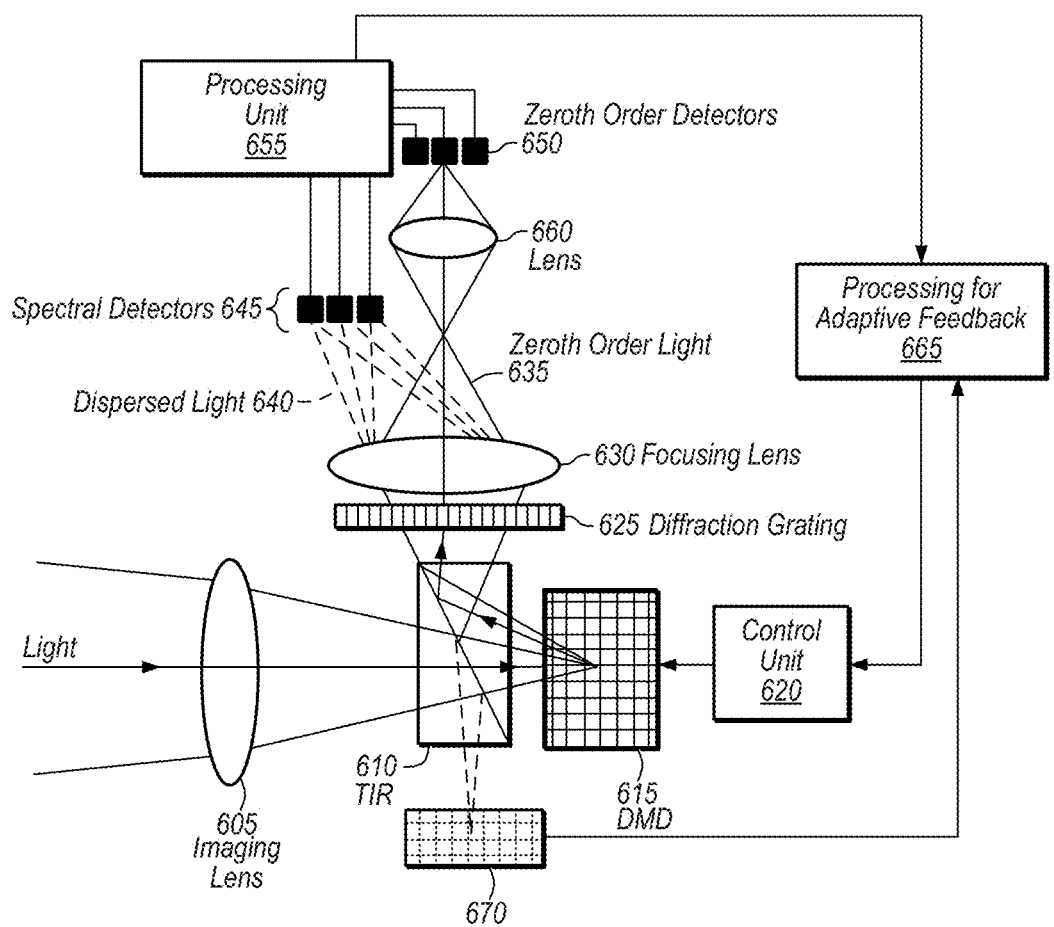
FIG. 6 illustrates an embodiment of the CS spectral imager that is configured for adaptive feedback to control unit 620.

Additional embodiments include alternative optical paths that can provide additional simultaneous measurements from the system. FIG. 6 contains the basic CS spectral imaging architecture comprising the imaging lens 605 that images a scene through the total internal reflection (TIR) prism 610 to the DMD 615. The modulated image from 615 is reflected by TIR 610 into the diffraction grating 625 and focusing lens 630. A set of detectors 645 can be used to detect the spectral signals diffracted off-axis. The on-axis zeroth order light may be focused or imaged by lens system 660 to detector 650, which can be a single detector, a discrete array, or a focal plane array detector.

The system in FIG. 6 also shows an additional detector 670 that intercepts light that has been split off the main imaging path in front of the DMD. This light, which is not modulated by the DMD, can be separated from the main imaging path by wavelength, polarization or other feature and can be made to form an image of the scene on detector 670 and provide an additional image similar to the one formed on the DMD. This image could be at a different waveband creating a dual band, a different polarization, etc. and could be used to provide image information about the scene without CS reconstruction.

Signals from detectors 645, 650 and 670 may be processed via 665 and used to adaptively control the operation of DMD 615

In any of these embodiments, the modulator may be configured to perform other processing tasks such as region of interest definition, pixel exclusion, feature extraction, event detection, spectral signature development, target detection or other processing tasks defined by advanced algorithms.

As illustrated in FIG. 6, information from the various sensors can be processed by Processing Unit 655 and connected in a feedback loop 665 that may be used to control or adapt the CS data acquisition process, perform image processing, image enhancement, and target detection or for a host of other tasks in which information is extracted from CS measurements.

Figure 7:
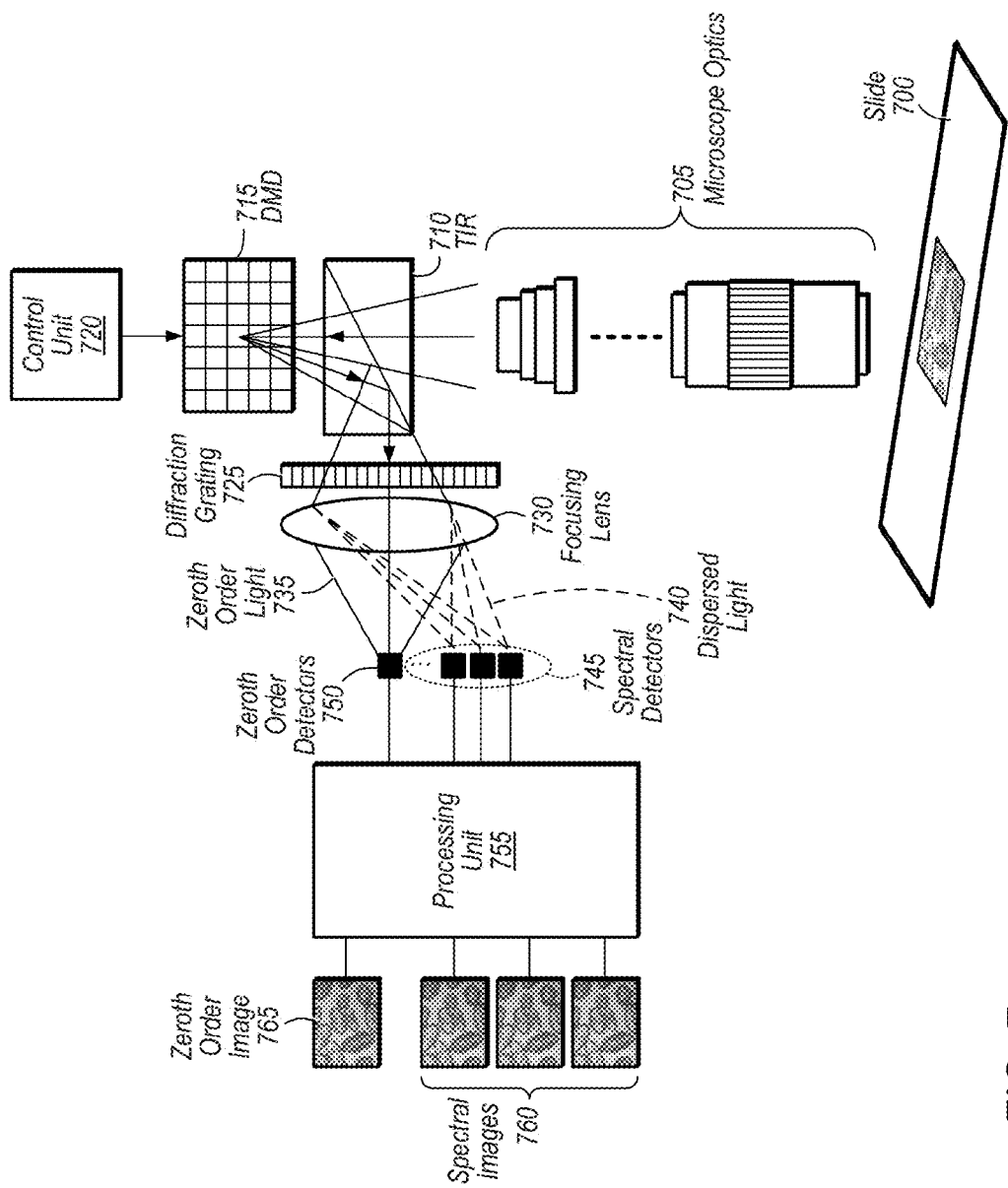
FIG. 7 illustrates an embodiment of the CS spectral imager that is configured for microscopy.

FIG. 7 shows the same system in a configuration useful as a microscope camera. Light from a slide 700 passes through microscope optics 705, through TIR prism 710, reflects from DMD 715 (which is controlled by control unit 720), reflects from an internal interface of the TIR prism 710, passes through diffraction grating 725 and focusing lens 730, whereupon the dispersed light 740 from the focusing lens impinges upon spectral detectors 745, and the zeroth order light 735 impinges upon zeroth order detector 750. Processing unit 755 operates on the signals captured by the detectors, e.g., to reconstruct spectral images 760 and zeroth order image 765.

Figure 8:
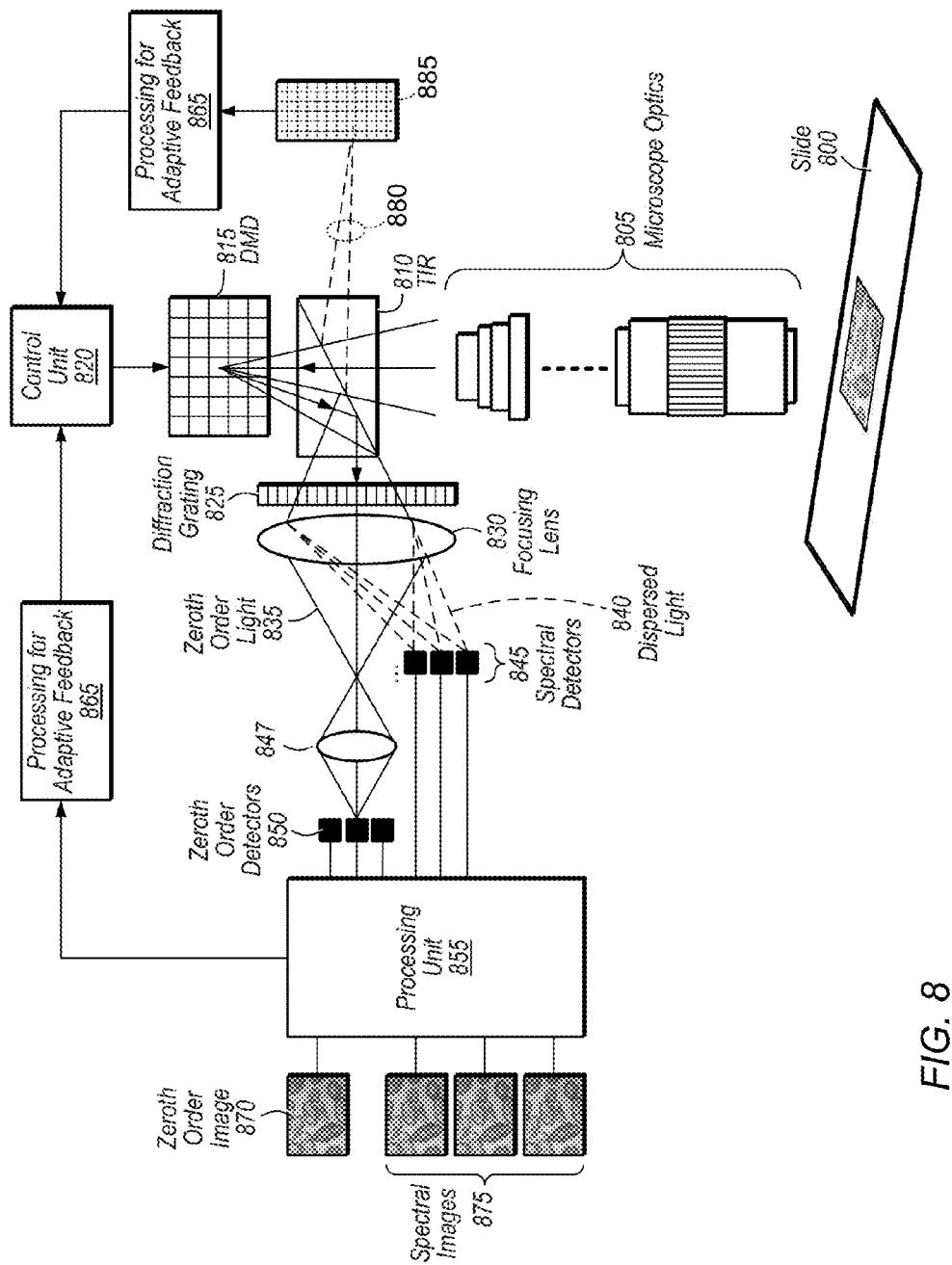
FIG. 8 illustrates an embodiment of the CS spectral imager that is configured for microscopy and adaptive feedback.

FIG. 8 shows a dual-band, multispectral, CS-based adaptive detection and imaging system. Light from a slide 800 passes through microscope optics 805, through TIR prism 810, reflects from DMD 815 (which is controlled by control unit 820), reflects from an internal interface of the TIR prism 810, passes through diffraction grating 825 and focusing lens 830, whereupon the dispersed light 840 from the focusing lens impinges upon spectral detectors 845, and the zeroth order light 835 impinges upon zeroth order detectors 850. A lens 847 may be used to focus or image the zeroth order light 835 onto the zeroth order detectors 850. Processing unit 855 operates on the signals captured by the detectors, e.g., to reconstruct spectral images 875 and zeroth order image 870. An additional light stream 880 may be reflected from the TIR 810 before impinging on the modulator. This light stream may be focused or imaged onto detectors 885. The signal from detectors 885 may be used to provide additional imaging information at broad band or narrow spectral wavebands, background light levels, or information to be used in processing for adaptive feedback 865 in the control unit 820 of the modulator.

The spectral response of the CS camera is governed by the diffractive properties of the DMD. The micromirror geometry of the DMD acts like a two-dimensional diffraction grating. Light incident on the DMD is diffracted by its micromirror geometry into a two-dimensional pattern of diffraction orders. The size, spacing and wavelength dependence of the diffracted orders in the far field of the DMD is described mathematically by the Fourier transform of the mirror array geometry. Additionally, the tilting action of the mirrors acts to intensify, or "blaze" only a certain subset of these diffracted orders defined by the size of the individual micromirror and its tilt angle. It is only this subset of diffracted orders that contains significant optical energy.

In the original (monochromatic) CS camera design, all spectral components of the light field reflected by the DMD and focused by the focusing lens appear within the area defined by the boundary of the blaze function. A single detector intercepts the blazed diffracted orders appearing in the back focal plane of the focusing lens.

When a diffraction grating is placed between the DMD and the focusing lens, the blazed diffracted orders are dispersed and propagate at different angles in proportion to their wavelength. Therefore, at the back focal plane of the focusing lens, the diffracted orders within the blaze are spatially separated by wavelength and the spectral components become individually accessible by a set of detectors positioned at the proper spacing.

In one embodiment, the diffraction grating is a sinusoidal phase grating. In another embodiment, the diffraction grating is a blazed diffraction grating.

If image information is contained in the light field that is incident on the DMD, then the spatial frequency spectrum of that image surrounds each diffracted order. It is the numerical aperture of an imaging system that represents the largest frequency spectrum of the image. Thus, the numerical aperture of the imaging system that images a scene on to the DMD determines the size of the spot of light comprising each diffracted order at the detector plane. As the numerical aperture of the imaging system increases, the spot size gets larger. In an efficient system the detector must be large enough to intercept the entire spot.

Mathematical Analysis of the Simplified CS Imaging Spectrometer Architecture

When the optical path comprised of an imaging system, DMD and sinusoidal grating is used in a CS camera, separated diffracted orders appear and can be measured by a CS camera detector and the measurements can be processed to yield an image at a distinct waveband. A mathematical description of the appearance of these diffracted orders shows that:

1. The blazed grating description of the DMD that is illuminated with an image and combined with the dispersive power of a sinusoidal diffraction grating results in a set of diffracted orders separated by wavelength 2. The blazing action of the DMD limits the number of diffracted orders and determines the angular position and spectral content of the diffracted orders that have significant optical energy 3. The dispersion action of the sinusoidal grating determines the relative angular position of the diffracted orders 4. The focusing lens produces the far field pattern of the light field wherein the spectrally dispersed diffracted orders are separated in space so that they are accessible by separate detectors.

5. Each of the separated diffracted orders is surrounded by the numerical aperture or pupil function of the imaging system and so contains all image information needed by the CS detector 6. A computational model developed from the diffraction analysis shows excellent agreement with experiment Previous work on analysis of the DMD as a switchable blazed grating has been provided in [K J Kearney, Z. Ninkov, "Characterization of a digital micromirror device for use as an optical mask in imaging and spectroscopy," SPIE 3239, 81-92 (1998)].

The present patent provides a detailed wavelength analysis useful in the design of a CS Spectral Imaging system. Also new in the present patent disclosure is the addition of a mathematical description of a sinusoidal diffraction grating after the DMD and the effect of the grating's wavelength dispersion on the DMD's diffracted orders, including their size, position and wavelength content, which are important considerations in the design of the Simplified CS Spectral Imager.

Figure 9:
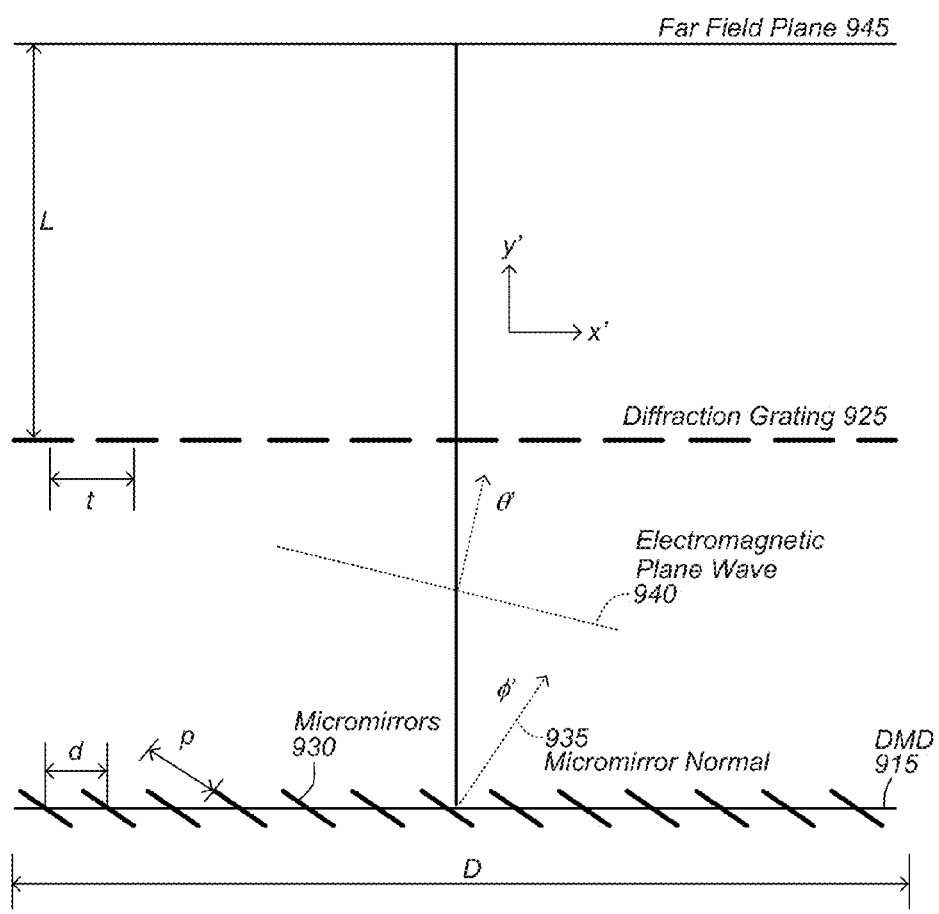
FIG. 9 illustrates parameters used to analyze the diffraction behavior of optical elements including a digital micromirror device and a diffraction grating.

A one-dimensional analysis follows for mathematically describing the basic spectral features of the Simplified CS Imaging Spectrometer system. A diagram illustrating the parameters of the analysis is shown in FIG. 9. In this analysis, the DMD 915 is a one-dimensional array of micromirrors 930 oriented along the x' axis. The mirrors are tilted and oriented at an angle $\varphi'$ to the y'-axis. The spacing between mirrors 930 is d, the size of each mirror is p≤d, and the overall extent of the DMD 915 is D.

The DMD is illuminated with a monochromatic electromagnetic plane wave 940 with spatially-varying amplitude $u(x')$, and wavelength $\lambda \ll p$. Plane wave 940 is incident from an angle of $\theta_i$ with respect to the grating normal (or DMD normal). The plane wave 940 is diffracted from the array of micromirrors 930, then passes through a sinusoidal transmission grating 925 of period t and modulation depth m. The doubly-diffracted wave then propagates to the far field plane 945 over a distance L>>D where detectors may be located.

Without any loss of generality, the model coordinate system is defined such that the x and x' axes are identical, but offset by the distance L along the y' axis. Angles are defined with respect to the y' axis (grating normal) direction, with positive angles clockwise from the axis.

For an incoming electromagnetic wave parallel to the y' axis, the mirror at the origin of the DMD grating acts to advance the wave's phase by an amount $2k_0 x' \sin \varphi'$ over an effective mirror size $p \cos \varphi'$, where $k_0 = 2\pi/\lambda$. The DMD grating can thus be modeled as the convolution of a mirror "unit cell" and a comb function that replicates the unit cell along the extent D of the grating $$q(x') = \left[\left[rect\left(\frac{x'}{p\cos\phi'}\right)e^{i2k_0 x' \sin\phi'}\right] \otimes comb\left(\frac{x'}{d}\right)\right] rect(D), \quad (1)$$

where the functions $$rect(z) = \begin{cases} 1 & |z| < 1/2 \\ 1/2 & |z| = 1/2 \\ 0 & \text{otherwise} \end{cases} \quad (2)$$

$$comb(z) = \sum_{n=-\infty}^{\infty} \delta(z-n)$$

denote the unit-width rectangle and infinite impulse train functions, respectively.

The incident electromagnetic plane wave propagating at angle $\theta_i$ with respect to the y' axis is represented as $$u(x') = \tilde{u}(x')e^{-ik_0 x' \sin \theta_i}, \quad (3)$$

where the information content of an image on this wave is represented in the amplitude $\tilde{u}(x')$.

The diffraction grating is represented by a sinusoidally varying transmission with modulation depth m.

$$s(x') = 1 - \frac{m}{2}\cos\left(\frac{2\pi x'}{t}\right) - \frac{m}{2}. \quad (4)$$

This leads to the following expression for the electromagnetic wave after reflection from the DMD grating and transmission through the sinusoidal grating $$g(x') = q(x')u(x')s(x') \quad (5)$$

$$= \tilde{u}(x')e^{-ik_0 x' \sin\theta_i}\left[\left[rect\left(\frac{x'}{p\cos\phi'}\right)e^{i2k_0 x' \sin\phi'}\right] \otimes comb\left(\frac{x'}{d}\right)\right] \cdot$$

$$rect\left(\frac{x'}{D}\right)\left[1 - \frac{m}{2}\cos\left(\frac{2\pi x'}{t}\right) - \frac{m}{2}\right]$$

Transforming this expression to the far field leads to an expression for the light field at the detector plane of the form $$G(f) = Ddp\cos\theta_i \cdot G_1 \otimes G_2 \otimes G_3, \quad (6)$$

with $$G_1 = \tilde{U}(f) \otimes \text{sinc}(fD)$$

$$G_2 = \delta\left(f + \frac{k_0 \sin\theta_i}{2\pi}\right) \otimes comb(df)\left[\delta\left(f - \frac{2k_0 \sin\phi'}{2\pi}\right) \otimes \text{sinc}(pf\cos\phi')\right]$$

and $$G_3 = \left(1 - \frac{m}{2}\right)\delta(f) - \frac{m}{4}\left[\delta\left(f - \frac{1}{t}\right) + \delta\left(f + \frac{1}{t}\right)\right], \quad (7)$$

where "$\otimes$" denotes the convolution operator.

The independent variable f in the far field is a spatial frequency, and is proportional to the transverse coordinate x in the viewing plane $$f = \frac{x}{\lambda L} = \frac{\sin \zeta}{\lambda} \quad (8)$$

or equivalently, the angular coordinate $\zeta$, which is the angle from the center of the gratings to the position in the far field.

The term $G_1$ is the Fourier transform of the image low-pass-filtered by convolution with the sinc function, whose width is inversely proportional to the width of the DMD grating. For a grating with D>>p, the sinc function is essentially a delta function and does not appreciably modify the image information content.

In the $G_2$ term, identified with the Fourier spectrum of the DMD grating the quantity in brackets can be simplified as a shift of the sinc function by the delta function, to obtain $$\text{sinc}\left(p\cos\phi'\left(f - \frac{2k_0 \sin\phi'}{2\pi}\right)\right) = \text{sinc}\left(p\cos\phi' f - \frac{p\sin 2\phi'}{\lambda}\right), \quad (9)$$

identified as the blaze amplitude, which when multiplied by the comb function, modulates the different diffraction orders of the DMD grating. The product of Equation 16 and the comb function are further shifted by convolution with the first delta function in term G2, to give $$\mathrm{sinc}\left(p\cos\phi'\left(f+\frac{k_0\sin\theta_i}{2\pi}\right)-\frac{p\sin2\phi'}{\lambda}\right)\mathrm{comb}\left(d\left(f+\frac{k_0\sin\theta_i}{2\pi}\right)\right) \quad (10)$$

Using Equation 8 to substitute for f, and simplifying results in $$G_2 = \mathrm{sinc}\left(\frac{p\cos\phi'}{\lambda}(\sin\zeta+\sin\theta_i-2\sin\phi')\right)\mathrm{comb}\left(\frac{d}{\lambda}(\sin\zeta+\sin\theta_i)\right). \quad (11)$$

From Equation 11, it is seen that the diffraction orders of the DMD grating occur where the argument of the comb function is an integer n, or at angles satisfying $$\sin\zeta + \sin\theta_i = n\frac{\lambda}{d}; n \in \mathbb{Z}, \quad (12)$$

which is the familiar grating equation. Importantly, the peak of the blaze amplitude is offset from the zeroth order of the grating by the specular angle for reflection from the DMD mirrors.

The $G_3$ term, associated with the diffraction grating, reduces the amplitude of the blazed DMD grating pattern by a factor of (1−m/2) and replicates it twice, offset from the original by the angles ±λ/t, with each of the replicates having an amplitude of m/4. Convolving G3 with the G2 term obtains $$G_2 \otimes G_3 = \left(1-\frac{m}{2}\right)\mathrm{sinc} \quad (13)$$

$$\left(\frac{p\cos\phi'}{\lambda}(\sin\zeta+\sin\theta_i-2\sin\phi')\right)\cdot\mathrm{comb}\left(\frac{d}{\lambda}(\sin\zeta+\sin\theta_i)\right) +$$

$$\frac{m}{4}\mathrm{sinc}\left(\frac{p\cos\phi'}{\lambda}\left(\sin\zeta+\sin\theta_i+\frac{\lambda}{t}-2\sin\phi'\right)\right)\cdot$$

$$\mathrm{comb}\left(\frac{d}{\lambda}\left(\sin\zeta+\sin\theta_i+\frac{\lambda}{t}\right)\right) +$$

$$\frac{m}{4}\mathrm{sinc}\left(\frac{p\cos\phi'}{\lambda}\left(\sin\zeta+\sin\theta_i-\frac{\lambda}{t}-2\sin\phi'\right)\right)\cdot$$

$$\mathrm{comb}\left(\frac{d}{\lambda}\left(\sin\zeta+\sin\theta_i-\frac{\lambda}{t}\right)\right)$$

Convolving Equation 13 with the G1 term places a copy of the filtered Fourier transform of the image at each of the three copies of the grating orders.

The first term of Equation 13 contains the sinc-shaped blaze envelope whose angular width encompasses the diffracted orders of the DMD that contain significant energy. Orders outside the envelope do not contain significant energy and do not appear in the far field. An examination of the blaze envelope defines the orders and wavelengths that may be available for measurement in the CS Spectral Imager.

The second and third terms of Equation 13 represent two replicated DMD blaze envelopes that are the first diffracted orders of the sinusoidal grating. These replicated DMD blaze envelopes appear on either side of the central undeviated (zeroth order) blaze envelope. The importance of these terms is that they describe the dispersion effect of the sinusoidal grating on the diffracted orders of the DMD contained within the blaze envelope. Different diffraction orders of the DMD will have different positions as a function of wavelength due to the additional dispersion of the second grating. It is this dispersion effect that separates the orders into spots of different wavelengths that are available for measurement in the CS Spectral Imager.

Note that Equation 13 shows that there is an asymmetry in the positioning of the orders.

Because the blaze envelope of the DMD grating controls which wavelengths and diffraction orders continue on to the sinusoidal grating, it is sufficient to examine the first term of Equation 13 to determine the orders and wavelengths that appear in the far field. To a large extent, the DMD blaze envelope is the principal and dominant feature characterizing the output of the grating spectrometer model, and its content is only slightly modified by the subsequent replication and dispersion provided by the sinusoidal grating.

The far-field amplitude of the first term in Equation 13 is maximum where the argument of the sinc( ) function is equal to zero and simultaneously the argument of the comb( ) functions is an integer, that is for the far-field position $$\sin\zeta = n\frac{\lambda_b}{d} - \sin\theta_i, \quad (14)$$

for the combinations of diffraction order n and "blaze wavelength" $\lambda_b$ that satisfy $$\frac{n\lambda_b}{d} = 2\sin\phi'; n \in \pm\mathbb{N}. \quad (15)$$

Positions in the far-field are expressed as an angular coordinate sin ζ=x/L because of the natural relationship with the grating equation.

In practice, one has a range of wavelengths of interest, say from $\lambda_{min}$ to $\lambda_{max}$, and a range of diffraction orders nj may contribute within the blaze envelope. To find the range of participating orders that contain at least part of their wavelength range within the blaze envelope, the grating equation is substituted for sin ζ in the sinc function of the first term of Equation 13.

The blaze amplitude envelope goes to zero where the argument of the sinc function is equal to a non-zero integer, so the width of the main lobe of the blaze envelope is thus between the ±1st zeros of the sinc. Finding the values of n that correspond to the ±1st zeros of the sinc obtains $$n = \frac{2d\sin\phi'}{\lambda} \pm \frac{d\sec\phi'}{p}, \quad (16)$$

from which two values of n are found for each of the two wavelengths $\lambda_{min}$ and $\lambda_{max}$ $$n_{min} = \begin{cases} \left\lceil \frac{2d\sin\phi'}{\lambda_{min}} + \frac{d\sec\phi'}{p} \right\rceil; & \phi' < 0 \\ \left\lceil \frac{2d\sin\phi'}{\lambda_{max}} - \frac{d\sec\phi'}{p} \right\rceil; & \phi' > 0 \end{cases}, \quad (17)$$

-continued $$n_{max} = \begin{cases} \left\lfloor \left| \frac{2d\sin\phi'}{\lambda_{max}} + \frac{d\sec\phi'}{p} \right| \right\rfloor; & \phi' < 0 \\ \left\lfloor \left| \frac{2d\sin\phi'}{\lambda_{min}} - \frac{d\sec\phi'}{p} \right| \right\rfloor; & \phi' > 0 \end{cases},$$

where the $\lfloor z \rfloor$ and $\lceil z \rceil$ brackets denote the floor and ceiling functions, respectively.

The range of participating diffraction orders "deliver" different portions of the wavelength range of interest to different spatial locations within the blaze envelope described by the first term of Equation 13, but the position and mean full-width of the main lobe $$\omega = \frac{\lambda_{min} + \lambda_{max}}{p\cos\phi'} \quad (18)$$

(in units of sin $\zeta$) are unchanged for different orders.

However, for the two replicated DMD blaze envelopes that are diffracted by the sinusoidal grating and appear on either side of the central undeviated blaze envelope, different diffraction orders will have different positions due to the additional dispersion of the second grating given by $$\sin\zeta = \left(\frac{n}{d} \mp \frac{1}{t}\right)\lambda - \sin\theta_i, \quad (19)$$

with the minus sign corresponding to the second term in Equation 13 and the plus sign corresponding to the third term.

The preceding analysis describes the optical output from the Simplified CS Spectral Imager at the detector plane. Knowledge of the position and size of the spectral components in the output can be used for system design.

Numerical Modeling of the Mathematical Analysis

Figure 10:
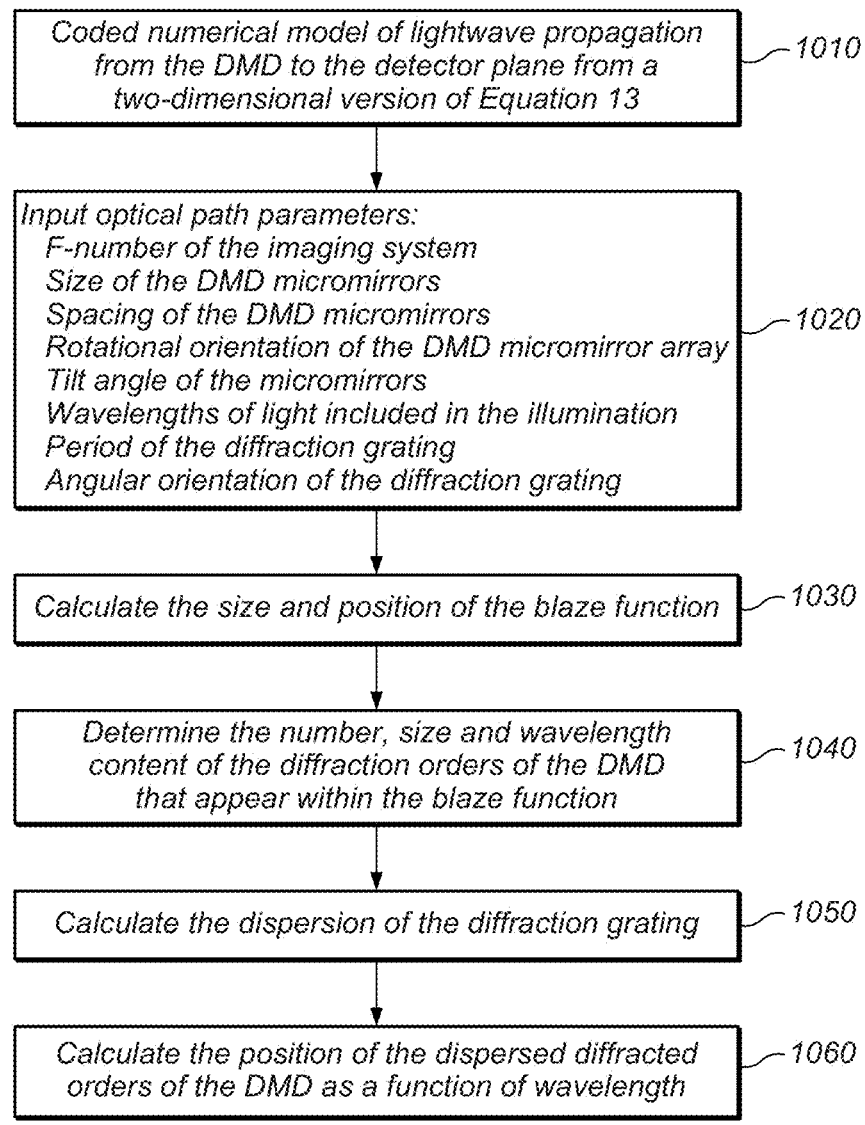
FIG. 10 is a flowchart for a method of calculating the diffraction behavior of optical elements including a digital micromirror device and a diffraction grating.

Calculations necessary to design a system can be performed using a numerical model of Equation 13 that has been coded in software. A flow chart for the software is shown in FIG. 10.

The procedure begins with entering parameters describing the optical path for performing the numerical propagation of light (1010) from the DMD through the diffraction grating to the far field using the Fourier optics based formulation that result in Equation 13.

At 1020, a number of system parameters are entered.

Based on these parameters, the size and position of blaze function is calculated (as indicated at 1030).

At 1040, the number, size and wavelength content of the diffraction orders of the DMD that appear within the blaze function are determined.

At 1050, the dispersion of the diffraction grating is calculated.

From the calculated dispersion of the diffraction grating, the position of the diffracted orders is calculated (as indicated at 1060). Using this information the arrangement of detectors can be determined that will measure the desired spectral components in the CS Spectral Imager.

Figure 11:
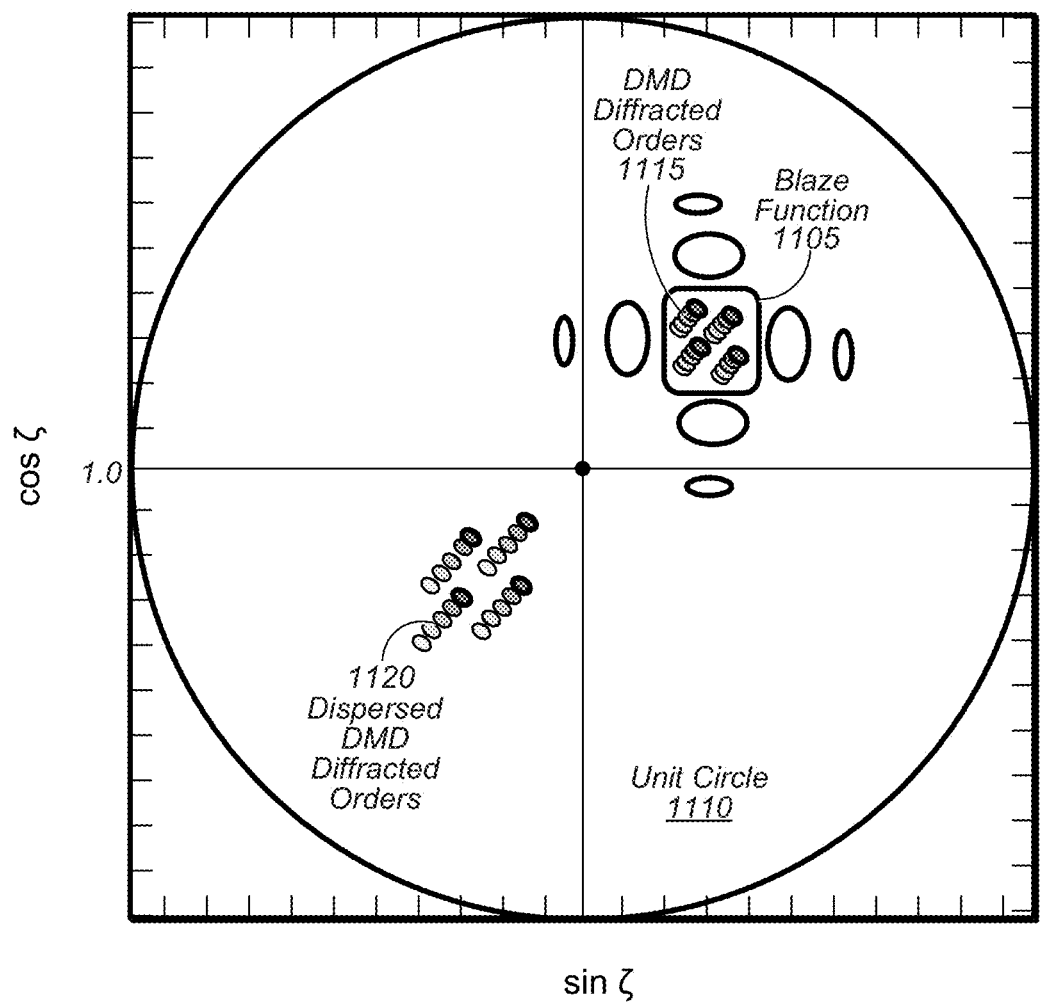
FIG. 11 depicts the pattern of light output in the far field from a two-dimensional numerical model that is graphed as a function of angle within a unit circle 1110.

FIG. 11 depicts the pattern of light output in the far-field from a two-dimensional numerical model. Positions in the far-field are expressed as an angular coordinate sin $\zeta$=x/L because of the natural relationship with the grating equation. This coordinate is also expedient because it is identified with the concept of Direction Cosine space, where a full hemisphere of solid angle is mapped to a unit radius circle by projection of direction cosines of directional unit vectors onto the equatorial plane. In one dimension, the entire spatial line in the far field from $-\infty < x < \infty$ maps to angles $$-\frac{\pi}{2} < \zeta < \frac{\pi}{2},$$

which maps to Direction Cosines space $-1 < \sin\zeta < 1$. Thus, in two-dimensions all possible positions are contained within the unit circle 1110 defined by $\sin^2 \zeta + \cos^2 \zeta = 1$.

The blaze function 1105 is a two-dimensional Sinc( ) function whose central lobe contains four diffracted orders of the DMD 1115. Each of these orders are shown to contain a range of wavelength content. (Different wavelengths are illustrated with different shades of gray with lighter shades corresponding to increasing wavelength.) The dispersed set of orders 1120 belongs to the first order of the diffraction grating and shows that light is deviated along the grating vector, oriented diagonally in the figure, as a function of wavelength. A set of detectors can be placed at locations intercepting desired components of the dispersed diffracted orders.

In one set of embodiments, a method 1200 for designing a spectral sensing device may be performed as shown in FIG. 12. (Method 1200 may also include any subset of the features, elements and embodiments described above.) The method 1200 may implemented by a computer.

At 1210, the computer performs computational operations, wherein the computational operations determine the positions of diffracted orders of an optical system model that models at least an array of light modulating elements and a diffraction grating, wherein the diffracted orders correspond to respective spectral components of input light to the optical system model, wherein the positions of the diffracted orders are determined at a target plane of the optical system model.

At 1220, the computer stores the positions of the diffracted orders in a memory, wherein the positions determine corresponding locations for light detectors in the spectral sensing device.

In some embodiments, the method 1200 may also include assembling the spectral sensing device by modifying a single pixel camera, wherein, prior to said modifying, the single pixel camera includes the array of light modulating elements and a light detector L. The action of modifying the single pixel camera may include: (a) installing the diffraction grating at a location consistent with the optical system model; (b) removing the light detector L; and (c) installing the light detectors respectively at said positions of the diffracted orders.

In some embodiments, the single pixel camera may include a lens subsystem, wherein the optical system model also models the lens subsystem, wherein said installing the diffraction grating is between the array of light modulating elements and the lens subsystem.

In some embodiments, the method 1200 may include assembling the spectral sensing device, wherein said assembling includes: (a) installing the array of light modulating elements and the diffraction grating at relative locations agreeing with said optical system model; and (b) installing the light detector respectively at said positions of the diffracted orders.

In some embodiments, the optical system model also models a lens subsystem, wherein the lens subsystem is situated after the diffraction grating according to a flow of light through the optical system model, wherein said assembling also includes installing the lens subsystem at a relative location agreeing with said optical system model.

In some embodiments, the optical system model includes: (1) diffractive properties of the array of light modulating elements; (2) diffractive properties of the diffraction grating; and (3) a distance between the diffraction grating and the target plane.

In some embodiments, the computational operations also determine sizes of the diffracted orders on the target plane, wherein said sizes are usable to determine respective sizes for the light detectors.

In one set of embodiments, a spectral sensing device 1300 may be configured as shown in FIG. 13. The spectral sensing device 1300 may include an optical system 1310 and a plurality of light detectors $LD_1, \ldots, LD_N$, where N>1 denotes the number of detectors. (The spectral sensing device 1300 may also include any subset of the features, elements and embodiments described above.)

The optical system includes an array of light modulating elements and a diffraction grating, e.g., as variously described above in connection with FIGS. 5-8.

The light detectors $LD_1$ through $LD_N$ are located at respective positions within a target plane (TP) of the optical system 1310, wherein the positions are positions of diffracted orders $O_1, \ldots, O_N$ of output light from the optical system, wherein the diffracted orders correspond respectively to spectral components (or spectral ranges) of the input light L to the optical system.

In some embodiments, the spectral sensing device may also include one or more broadband light detectors located in the target plane at a position of a zeroth undiffracted order $O_0$ of the optical system. FIG. 13 shown a single detector $LD_0$ at the zeroth order $O_0$.

In some embodiments, the spectral sensing device also includes a spectral selection subsystem configured to: (a) receive the input light L; (b) output a first portion of the input light to the array of light modulating elements; and output a second portion of the input light to a secondary path leading to an additional light detector. The first and second portions may be spectral portions, spatial portions, intensity portions, etc.

In some embodiments, the array of light modulating elements is configured to apply a temporal sequence of spatial patterns to an input stream of light, e.g., as variously described above. The spectral sensing device further may also include a controller configured to: (a) receive signals from the light detectors; and (b) dynamically adapt the sequence of spatial patterns based on an analysis of the received signals.

In some embodiments, the spectral sensing device has been realized by modification of a pre-existing single pixel camera, e.g., as variously described above.

In some embodiments, the positions of the diffracted order have been computed based on an optical model of the optical system, e.g., as variously described above. For example, see the discussions above of FIGS. 11 and 12.

In some embodiments, the optical system also includes a lens subsystem situated after the diffraction grating in an optical flow of the optical system, e.g., as variously described above.

Any of the various embodiments described herein may be realized in any of various forms, e.g., as a computer-implemented method, as a computer-readable memory medium, as a computer system, etc. A system may be realized by one or more custom-designed hardware devices such as ASICs, by one or more programmable hardware elements such as FPGAs, by one or more processors executing stored program instructions, or by any combination of the foregoing.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a wearable computer, a sensing device, an image acquisition device, a video acquisition device, a computer embedded in a living organism, etc. The computer system may include one or more display devices. Any of the various computational results disclosed herein may be displayed via a display device or otherwise presented as output via a user interface device.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A compressive sensing (CS) spectral imaging device comprising:

an array of diffractive light modulating elements configured to apply a temporal sequence of spatial patterns to an input image to obtain a temporal sequence of modulated light streams, wherein the array of diffractive light modulating elements is further configured to spatially differentiate light into a plurality of different frequency bands, wherein light comprised within each of the plurality of different frequency bands in the input image is spatially differentiated within the modulated light streams as different modulated spectral components of the input image;

a diffraction grating configured to diffract the modulated light stream such that each modulated spectral component of the input image is spatially dispersed according to frequency;

a lens subsystem and a plurality of light detectors, wherein the lens subsystem is configured to focus each modulated spectral component of the input image on a respective one of the plurality of light detectors, wherein the lens subsystem and the plurality of light detectors are positioned at least in part based on a degree of spatial differentiation of the input image into the plurality of different frequency bands by the diffractive light modulating elements; and wherein each of the plurality of light detectors are configured to detect a respective one of the modulated spectral components of the input image, wherein the detected modulated spectral components of the input image are useable, in combination with the temporal sequence of spatial patterns, to reconstruct an approximation of a spectral component of the input image.

2. The CS spectral imaging device of claim 1, the device further comprising:

a processing unit, wherein each one of the plurality of light detectors is configured to output its respective one of the modulated spectral components of the input image to the processing unit, wherein the processing unit is configured to perform compressive sensing imaging on each of the received modulated spectral components based on the temporal sequence of spatial patterns to construct an output image comprising an approximation of a spectral component of the input image, wherein said compressive sensing imaging is performed separately for each of the modulated spectral components; and wherein the processing unit is configured to combine the output images into an approximate spectral reconstruction of the input image.

3. The CS spectral imaging device of claim 1, further comprising:

one or more broadband light detectors located at a position of a zeroth diffraction order of the optical system.

4. The CS spectral imaging device of claim 1, further comprising a spectral selection subsystem configured to:

receive the input image;

output a first portion of the input image to the array of light modulating elements;

output a second portion of the input image to a secondary path leading to an additional light detector.

5. The CS spectral imaging device of claim 1, further comprising a controller configured to:

receive the modulated spectral components of the input image from the light detectors; and dynamically adapt the temporal sequence of spatial patterns based on an analysis of the modulated spectral components of the input image.

6. The CS spectral imaging device of claim 1, wherein the diffractive array of light modulating elements is a digital micromirror device (DMD), wherein a diffractive property of the array of light modulating elements includes a tilt angle of micromirrors of the DMD.

7. The CS spectral imaging device of claim 1, wherein the plurality of light detectors are placed at two or more spatial locations that have been computed by a computer based on an optical model of the CS spectral imaging device, wherein the optical model models diffractive properties of said array of diffractive light modulating elements and diffractive properties of the diffraction grating, wherein the two or more computed spatial locations correspond respectively to two or more different frequency bands.

8. The CS spectral imaging device of claim 1, wherein the array of diffractive light modulating elements comprises a blazed diffraction grating.

9. The CS spectral imaging device of claim 1, wherein the spatial patterns are incoherent relative to a pattern set in which the images are sparse, wherein the number of pixels in the input image is greater than the number of modulated light streams in the temporal sequence of modulated light streams.

10. A method for operating a compressive-sensing (CS) spectral imaging device, the method comprising:

using an array of diffractive light modulating elements configured to apply a temporal sequence of spatial patterns to an input image to obtain a temporal sequence of modulated light streams, wherein the array of diffractive light modulating elements is further configured to spatially differentiate light into a plurality of different frequency bands, wherein light comprised within each of the plurality of different frequency bands in the input image is spatially differentiated within the modulated light streams as different modulated spectral components of the input image;

diffracting the modulated light stream with a diffraction grating such that each modulated spectral component of the input image is spatially dispersed according to frequency;

using a lens subsystem to focus each modulated spectral component of the input image on a respective one of a plurality of light detectors, wherein the lens subsystem and the plurality of light detectors are positioned at least in part based on a degree of spatial differentiation of the input image into the plurality of different frequency bands by the diffractive light modulating elements; and using each of the light detectors to detect a respective one of the modulated spectral components of the input image, wherein the detected modulated spectral components of the input image are useable, in combination with the temporal sequence of spatial patterns, to reconstruct an approximation of a spectral component of the input image.

11. The method of claim 10, the method further comprising:

outputting, by each one of the plurality of light detectors, the detected modulated spectral components of the input image to a processing unit, wherein the processing unit is configured to perform compressive sensing imaging on each of the received modulated spectral components based on the temporal sequence of spatial patterns to construct an output image comprising an approximation of a spectral component of the input image, wherein said compressive sensing imaging is performed separately for each of the modulated spectral components; and combining, using the processing unit, the output images into an approximate spectral reconstruction of the input image.

12. The method of claim 10, the method further comprising:

placing one or more broadband light detectors at a position of a zeroth diffraction order of the optical system.

13. The method of claim 10, the method further comprising:

using a spectral selection subsystem to:

receive the input image;

output a first portion of the input image to the array of light modulating elements;

output a second portion of the input image to a secondary path leading to an additional light detector.

14. The method of claim 10, the method further comprising:

using a controller to:
- receive the modulated spectral components of the input image from the light detectors; and
- dynamically adapt the temporal sequence of spatial patterns based on an analysis of the modulated spectral components of the input image.

15. The method of claim 10, wherein the diffractive array of light modulating elements is a digital micromirror device (DMD), wherein a diffractive property of the array of light modulating elements includes a tilt angle of micromirrors of the DMD.

16. The method of claim 10,
wherein the plurality of light detectors are placed at two or more spatial locations that have been computed by a computer based on an optical model of the CS spectral imaging device, wherein the optical model models diffractive properties of said array of diffractive light modulating elements and diffractive properties of the diffraction grating, wherein the two or more computed spatial locations correspond respectively to two or more different frequency bands.

17. The method of claim 10,
wherein the array of diffractive light modulating elements comprises a blazed diffraction grating.

18. The method of claim 10,
wherein the spatial patterns are incoherent relative to a pattern set in which the images are sparse, wherein the number of pixels in the input image is greater than the number of modulated light streams in the temporal sequence of modulated light streams.

* * * * *